(12) United States Patent
Kimura et al.

(10) Patent No.: US 8,944,493 B2
(45) Date of Patent: Feb. 3, 2015

(54) CONSTRUCTION MACHINE

(75) Inventors: Shogo Kimura, Ritto (JP); Tomoyuki Tanaka, Yasu (JP); Hiroshi Tabeta, Konan (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/123,984

(22) PCT Filed: Jul. 9, 2012

(86) PCT No.: PCT/JP2012/067494
§ 371 (c)(1),
(2), (4) Date: Dec. 5, 2013

(87) PCT Pub. No.: WO2013/035426
PCT Pub. Date: Mar. 14, 2013

(65) Prior Publication Data
US 2014/0124280 A1    May 8, 2014

(30) Foreign Application Priority Data

Sep. 9, 2011    (JP) .................................. 2011-197037

(51) Int. Cl.
*B60N 2/38* (2006.01)
*B62D 33/06* (2006.01)
*E02F 9/08* (2006.01)
*B60H 1/00* (2006.01)
*B62D 25/20* (2006.01)
*E02F 9/16* (2006.01)
*B60H 3/06* (2006.01)

(52) U.S. Cl.
CPC .......... *B62D 33/0617* (2013.01); *E02F 9/0858* (2013.01); *B60H 1/00378* (2013.01); *B62D 25/20* (2013.01); *B62D 33/06* (2013.01); *E02F 9/16* (2013.01); *B60H 2003/065* (2013.01)
USPC ........................................................ 296/190.09

(58) Field of Classification Search
USPC .................................. 296/190.09; 180/89.12
See application file for complete search history.

(56) References Cited

U.S. PATENT DOCUMENTS

| 2008/0035401 A1* | 2/2008 | Ishii et al. .................. 180/89.12 |
| 2010/0072782 A1* | 3/2010 | Modzik et al. ........... 296/190.09 |
| 2010/0102594 A1* | 4/2010 | Kimura et al. ........... 296/190.01 |

FOREIGN PATENT DOCUMENTS

| JP | 04-027618 A | 1/1992 |
| JP | 5-8315 A | 2/1993 |
| JP | 07-061226 A | 3/1995 |
| JP | 2007-198057 A | 8/2007 |
| JP | 2009-012700 A | 1/2009 |
| JP | 4607778 B2 | 10/2010 |
| WO | 2004/078562 A1 | 9/2004 |

\* cited by examiner

*Primary Examiner* — Lori L Lyjak
(74) *Attorney, Agent, or Firm* — Mattingly & Malur, PC

(57) ABSTRACT

On a seat base (11) of a floor member (10), a rear surface plate (11C), an operator's seat mounting plate (11D) on which an operator's seat (17) is mounted at a position higher than a footrest area (12) on which the foot is placed, and a duct accommodating space (14) formed in the vertical direction among the rear surface plate (11C), the operator's seat mounting plate (11D), and a rear position (12B) of the footrest area (12) are provided. An indoor air inlet duct (23) having the front surface side opened as a filter fitting hole (25) and introducing air in an occupying space (21) toward an indoor unit (22) of an air-conditioning unit is provided on the duct accommodating space (14). An indoor air filter (26) for catching dusts in the air is provided on the filter fitting hole (25) of the indoor air inlet duct (23).

8 Claims, 20 Drawing Sheets

CONSTRUCTION MACHINE

TECHNICAL FIELD

The present invention relates to a construction machine provided with a cab box on a floor member, for example, or to a construction machine such as a hydraulic excavator, a hydraulic crane and the like, for example.

BACKGROUND ART

In general, a hydraulic excavator which is a typical example of a construction machine is composed of an automotive lower traveling structure, an upper revolving structure rotatably mounted on the lower traveling structure, and a working mechanism provided capable of moving upward/downward on the front side of the upper revolving structure.

The upper revolving structure is composed of a revolving frame forming a support structural body, a floor member provided on the revolving frame, in which the rear side is a seat base on which an operator's seat is mounted and the front side is a footrest area on which the operator places the foot, a cab box provided by covering the periphery and the upper part of the floor member in order to form a occupying space on the floor member, and an indoor unit of an air conditioning unit mounted on the floor member and supplying sucked air into the occupying space as conditioned air.

As the floor member according to a conventional art, the footrest area having a double-floor structure of a lower floor plate and an upper floor plate and configured such that a recess portion is formed in the lower floor plate, and the indoor unit of the air conditioning unit is accommodated in this recess portion is known. In this case, an indoor air suction port for sucking the air in the occupying space (indoor air) and an indoor air filter are arranged on the lower side of the footrest area integrally with the indoor unit (See Patent Document 1, for example).

As another conventional art, a configuration in which the indoor unit of the air conditioning unit is provided on the footrest area and located in the lower side of the operator's seat is known. In this another conventional art, the indoor air suction port is provided so as to be opened on the side of the indoor unit, and the indoor air filter is arranged at a position covering this indoor air suction port (Patent Document 2).

PRIOR ART DOCUMENTS

Patent Documents

Patent Document 1: International Publication No. WO 2004/078562 A1
Patent Document 2: Japanese Patent Laid-Open No. Hei 4-27618 A

SUMMARY OF THE INVENTION

According to the above described Patent Document 1, the indoor unit is arranged in the lower side of the footrest area, and the indoor air suction port and the indoor air filter are provided in this indoor unit. In Patent Document 2, the indoor unit is directly arranged on the footrest area, and the indoor air suction port and the indoor air filter are arranged on the floor surface which is the footrest area.

Here, the footrest area of the floor member is an occupying space and also a walking passage for the operator, and fine sands, dusts and the like much remain on the footrest area. Therefore, in case the indoor air filter is provided at a position lower than the footrest area or on the floor surface of the footrest area, the indoor air filter catches much fine sands, dusts and the like remaining on the footrest area. As a result, the indoor air filter can be easily clogged, and a frequency of a maintenance work of the indoor air filter such as inspection, cleaning and the like increases, which causes a problem that workability is poor.

Particularly, since the occupying space in the cab box of a small-sized hydraulic excavator is small, an installation space for members relating to the indoor unit is also limited. Thus, the indoor air suction port and the indoor air filter cannot be freely arranged.

In view of the above described conventional art problems, it is an object of the present invention to provide a construction machine which can reduce the frequency of the maintenance work of the indoor air filter and can improve workability by arranging the indoor air filter at a place where sands, dusts and the like do not easily clog.

(1) The construction machine according to the present invention comprises an automotive lower traveling structure; an upper revolving structure rotatably mounted on the lower traveling structure; a working mechanism provided capable of moving upward/downward on the upper revolving structure; and a counterweight provided on the rear side of the upper revolving structure in order to keep balance with the working mechanism, wherein the upper revolving structure is provided with a revolving frame forming a support structural body, a floor member provided on the revolving frame and having the rear side as a seat base on which an operator's seat is mounted and the front side as a flat-plate shaped footrest area on which an operator places a foot, a cab box provided covering a periphery and an upper part of the floor member and forming an occupying space inside, and an indoor unit of an air conditioning unit mounted on the floor member and supplying sucked air to the occupying space as conditioning air.

In order to solve the above described problem, a feature of the configuration employed by the present invention is that the seat base of the floor member has a rear surface plate rising from a rear end of the footrest area and extending in the left-right direction, an operator's seat mounting plate provided on an upper end of the rear surface plate and extending in the front-rear direction and on which the operator's seat is mounted, and a duct accommodating space formed in the vertical direction among the rear surface plate, the operator's seat mounting plate, and the footrest area; an indoor air inlet duct having the front surface side opened as a filter fitting hole and introducing air in the occupying space toward the indoor unit is provided in the duct accommodating space; and an indoor air filter for catching dusts in the air is provided on the filter fitting hole of the indoor air inlet duct.

With this arrangement, the indoor air filter provided in the duct accommodating space can be arranged at a position higher than the footrest area. Therefore, fine sands, dusts and the like remaining and floating over the footrest area cannot easily adhere to the indoor air filter, and clogging of the indoor air filter due to the sands, dusts and the like remaining on the footrest area can be prevented.

As a result, since clogging of the indoor air filter can be prevented, the frequency of the maintenance work such as inspection, cleaning and the like of the indoor air filter can be reduced, and workability of the construction machine can be improved. Particularly, even if the occupying space is small and the installation space for air conditioning parts is limited such as in a small-sized construction machine, the duct accommodating space can be formed in the vertical direction by using a space among the rear surface plate, the operator's seat mounting plate, and the footrest area, and the indoor air inlet duct and the indoor air filter can be arranged in this duct accommodating space.

(2) According to the present invention, the indoor air inlet duct is configured such that the indoor air filter is mounted vertically so that the sucking surface is oriented perpendicularly. In this case, the indoor air inlet duct can be formed thin in the front-rear direction and can be arranged in a small installation space formed in the vertical direction.

(3) According to the present invention, a left surface plate and a right surface plate supporting both ends in the left-right direction of the operator's seat mounting plate are provided on the seat base of the floor member, respectively; and the duct accommodating space is configured such that the both ends in the left-right direction are closed by each of the side surface plates. As a result, the both ends in the left-right direction of the operator's seat mounting plate can be supported by each of the side surface plates, and strength as the seat base can be obtained. Moreover, since the both ends in the left-right direction of the duct accommodating space can be closed by each of the side surface plates, sands, dusts and the like to enter the duct accommodating space from the left-right directions can be shut off.

(4) According to the present invention, a front cover closing the duct accommodating space between the footrest area and the operator's seat mounting plate and also covering the front side of the indoor air filter is provided on the front side of the seat base; and an indoor air suction port opened in a filter front space portion between a rear surface of the front cover and a front surface of the indoor air filter is provided on a front end portion of the operator's seat mounting plate, and the indoor air filter is configured such that indoor air is made to flow in from the indoor air suction port through the filter front space portion.

With this arrangement, the indoor air filter and the indoor air inlet duct can be covered by the front cover, and appearance can be made favorable. Moreover, the indoor air suction port through which the indoor air is made to flow into the indoor air filter is provided on the operator's seat mounting plate arranged at a position further higher than the indoor air filter. As a result, the air in the occupying space can flow in toward the indoor air filter from the indoor air suction port of the operator's seat mounting plate through the filter front space portion. On the other hand, since sands, dusts and the like which are heavier than air cannot pass the indoor air suction port provided on the operator's seat mounting plate higher than the footrest area, they cannot flow toward the indoor air filter, and clogging of the indoor air filter can be prevented for a long time.

(5) According to the present invention, the indoor air inlet duct is composed of a hollow box body having the inside as a ventilation path and the filter fitting hole provided by being opened on a front surface side of the box body and on which the indoor air filter is mounted; and an indoor air outlet port of the box body is configured to connect to an indoor air inlet duct connecting portion of the indoor unit. With this arrangement, the air having passed through the indoor air filter can be made to flow into the ventilation path in the box body through the filter fitting hole of the duct, and this indoor air can be supplied from the indoor air outlet port of the box body to the indoor air inlet duct connecting portion of the indoor unit.

(6) According to the present invention, the indoor unit of the air conditioning unit is configured to be mounted on the back surface side of the footrest area of the floor member. As a result, the indoor unit of the air conditioning unit can be mounted by using a space on the back surface side of the footrest area of the floor member.

(7) According to the present invention, a reinforcing connecting pipe for reinforcing the floor member is provided between a box body of the indoor air inlet duct and an indoor air inlet duct connecting portion of the indoor unit, and the indoor air inlet duct is configured to connect to the indoor air inlet duct connecting portion of the indoor unit through the reinforcing connecting pipe.

With this arrangement, the indoor air having flowed into the box body of the indoor air inlet duct can be supplied to the indoor air inlet duct connecting portion of the indoor unit through the reinforcing connecting pipe. Moreover, since the reinforcing connecting pipe also serves as a reinforcing member for reinforcing the floor member, strength of the floor member can be improved without increasing the number of components.

(8) According to the present invention, the upper revolving structure is formed as a rear small-revolving machine having a revolving radius between a revolving center with respect to the lower traveling structure and the counterweight, a prime mover is provided at a position on the front side of the counterweight on the upper revolving structure, and the floor member is provided on the revolving frame at a position on the front side of the prime mover.

MODE FOR CARRYING OUT THE INVENTION

As a construction machine according to embodiments of the present invention, a small-sized hydraulic excavator will be described below in detail as an example by referring to the attached drawings.

FIGS. 1 to 15 illustrate a first embodiment of the construction machine according to the present invention.

Figure 1:
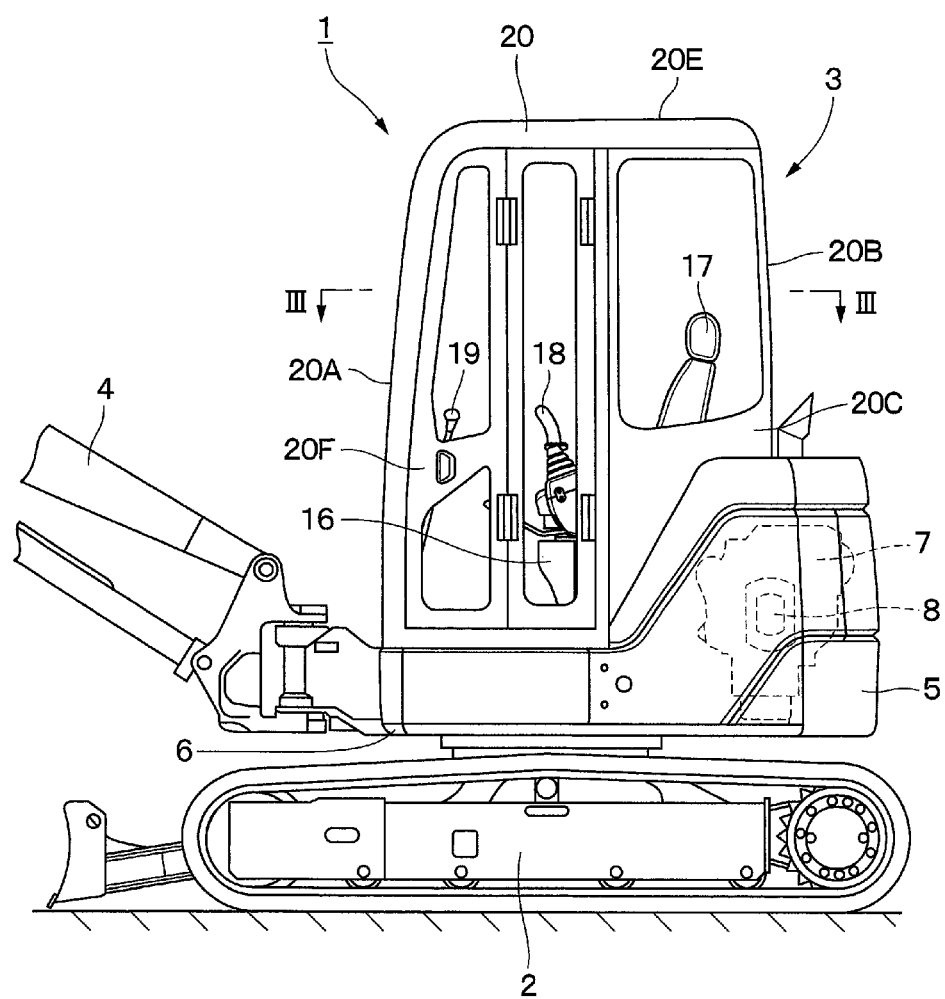
FIG. 1 is a front view illustrating a hydraulic excavator applied to a first embodiment of the present invention.

In FIG. 1, designated at 1 is a crawler type hydraulic excavator as a construction machine applied to the first embodiment. This hydraulic excavator 1 is a small-sized hydraulic excavator called mini excavator suitable for a work in a narrow working site. The hydraulic excavator 1 is composed of an automotive lower traveling structure 2, an upper revolving structure 3 rotatably mounted on the lower traveling structure 2, a working mechanism 4 provided on the front side of the upper revolving structure 3 and carrying out an excavating work of earth and sand and the like, and a counterweight 5 provided on the rear side of the upper revolving structure 3. This counterweight 5 is to take a balance with the working mechanism 4 and is formed by being curved in an arc shape so as to cover the rear side of an engine 7 which will be described later.

Figure 2:
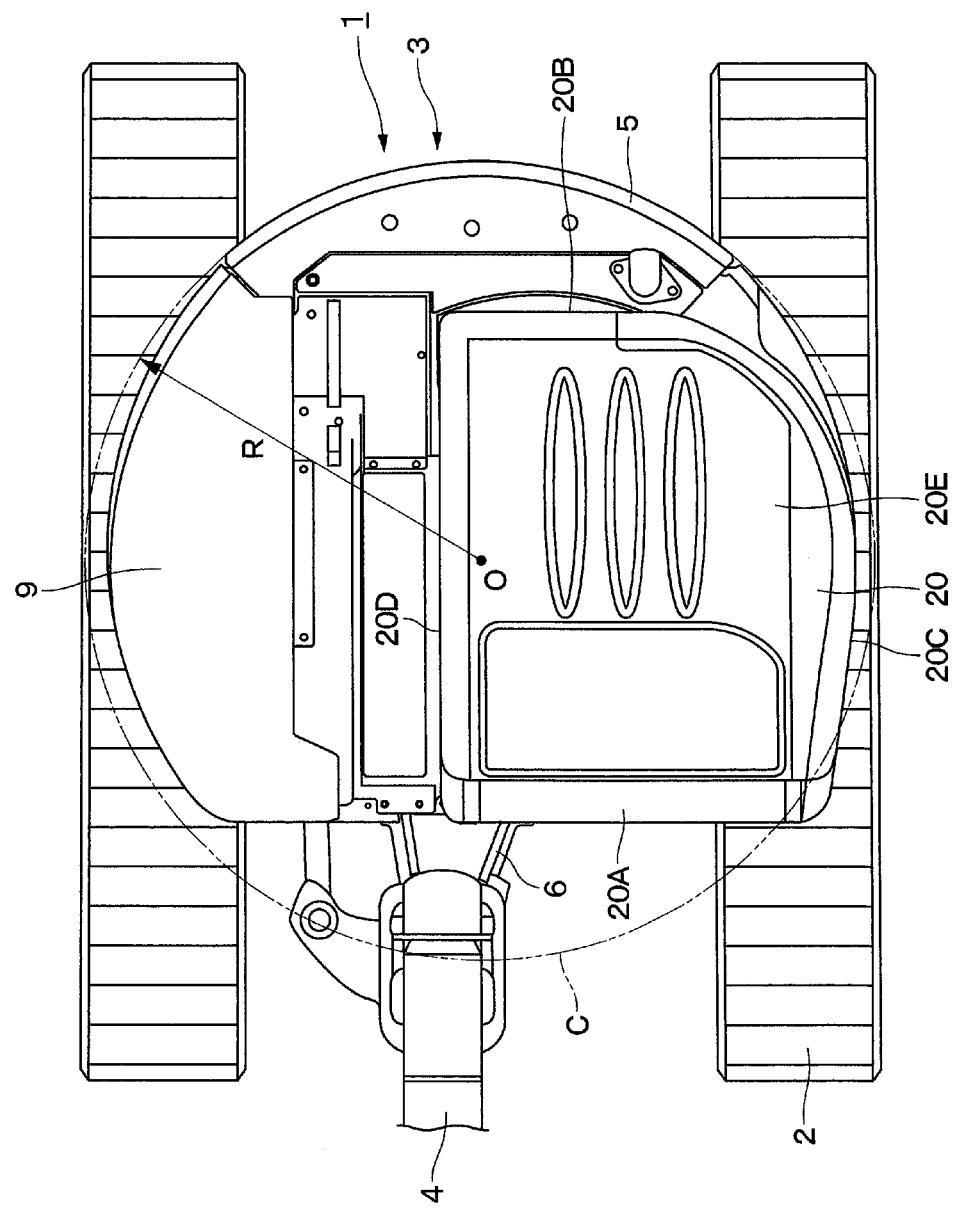
FIG. 2 is a plane view illustrating the hydraulic excavator in an enlarged manner.

As shown in FIG. 2, the upper revolving structure 3 has a width dimension in the left and right dimension substantially equal to a vehicle width of the lower traveling structure 2 and is also formed having a substantially circular shape when seen from above so that it is accommodated in an imaginary circle C having a revolving radius R around a revolving center O. As a result, the hydraulic excavator 1 is configured as a hydraulic excavator of a small rear revolving type in which, assuming a distance between the revolving center O to the lower traveling structure 2 and the counterweight 5 as the revolving radius R, a rear surface of the counterweight 5 is substantially accommodated within a vehicle width of the lower traveling structure 2 when the upper revolving structure 3 revolves on the lower traveling structure 2 around the revolving center O.

The above described revolving radius R is specified by the distance from the revolving center O to the rear surface of the counterweight 5, and the above described imaginary circle C is a trajectory of the rear surface of the counterweight 5 when the upper revolving structure 3 revolves.

Here, the upper revolving structure 3 is composed of a revolving frame 6, a floor member 10, a front cover 16, an operator's seat 17, a cab box 20, an indoor unit 22, an indoor air inlet duct 23, an indoor air filter 26, an outdoor air inlet duct 28, an outdoor air filter 29 and the like which will be described later.

Designated at 6 is the revolving frame of the upper revolving structure 3. This revolving frame 6 is formed as a support structural body mounted on the lower traveling structure 2. On the front side of the revolving frame 6, a working mechanism 4 is mounted capable of swing and moving upward/downward.

The engine 7 constitutes a prime mover and is mounted on the rear side of the revolving frame 6 at a position on the front side of the counterweight 5. The engine 7 rotates and drives a hydraulic pump 8 (indicated by a dotted line in FIG. 1, respectively). Moreover, an exterior cover 9 is provided on the revolving frame 6 at a position in the periphery of the cab box 20 (floor member 10) which will be described later.

Subsequently, the floor member 10 provided on the front side of the engine 7 in the revolving frame 6 will be described.

Designated at 10 is the floor member provided closer to the left side on the revolving frame 6 at a position on the front side of the engine 7 (See, FIGS. 3 to 8). This floor member 10 can be tilted up/down together with the operator's seat 17, the cab box 20 and the like which will be described later by using the front side position as a fulcrum by having the front side position tiltably supported by the front side position of the revolving frame 6. In this case, the floor member 10 is composed of a seat base 11, a footrest area 12, a lever/pedal mounting section 13 and the like which will be described later. It should be noted, in the embodiment, the example in which the floor member 10 is provided on the left side of the upper revolving structure 3 is illustrated, but it may be so configured that the floor member 10 is provided on the right side of the upper revolving structure 3.

Figure 8:
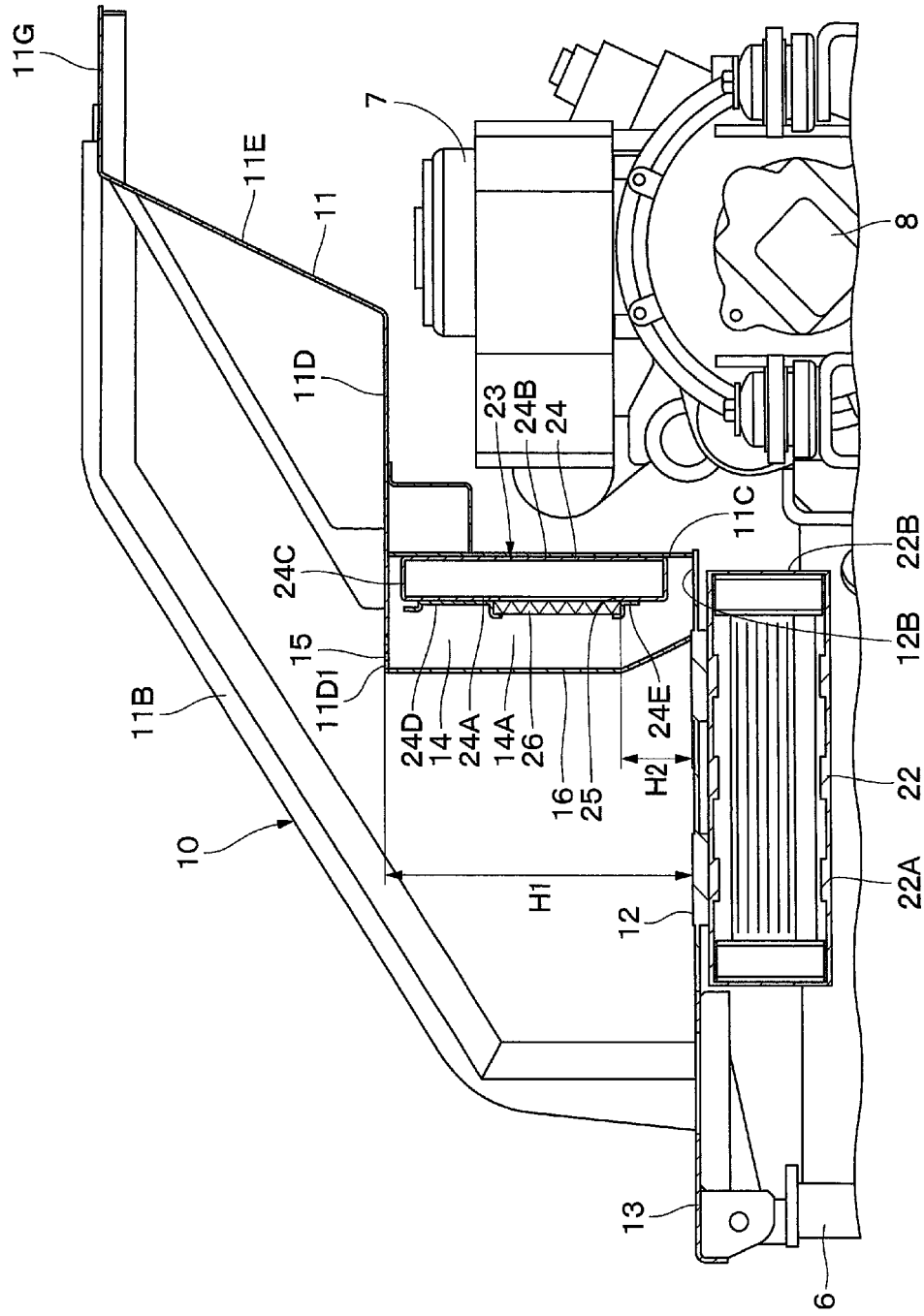
FIG. 8 is an enlarged sectional view of the floor member, the indoor unit, an indoor air inlet duct, an indoor air filter, and the front cover when seen from an arrow direction in FIG. 4.
Figure 9:
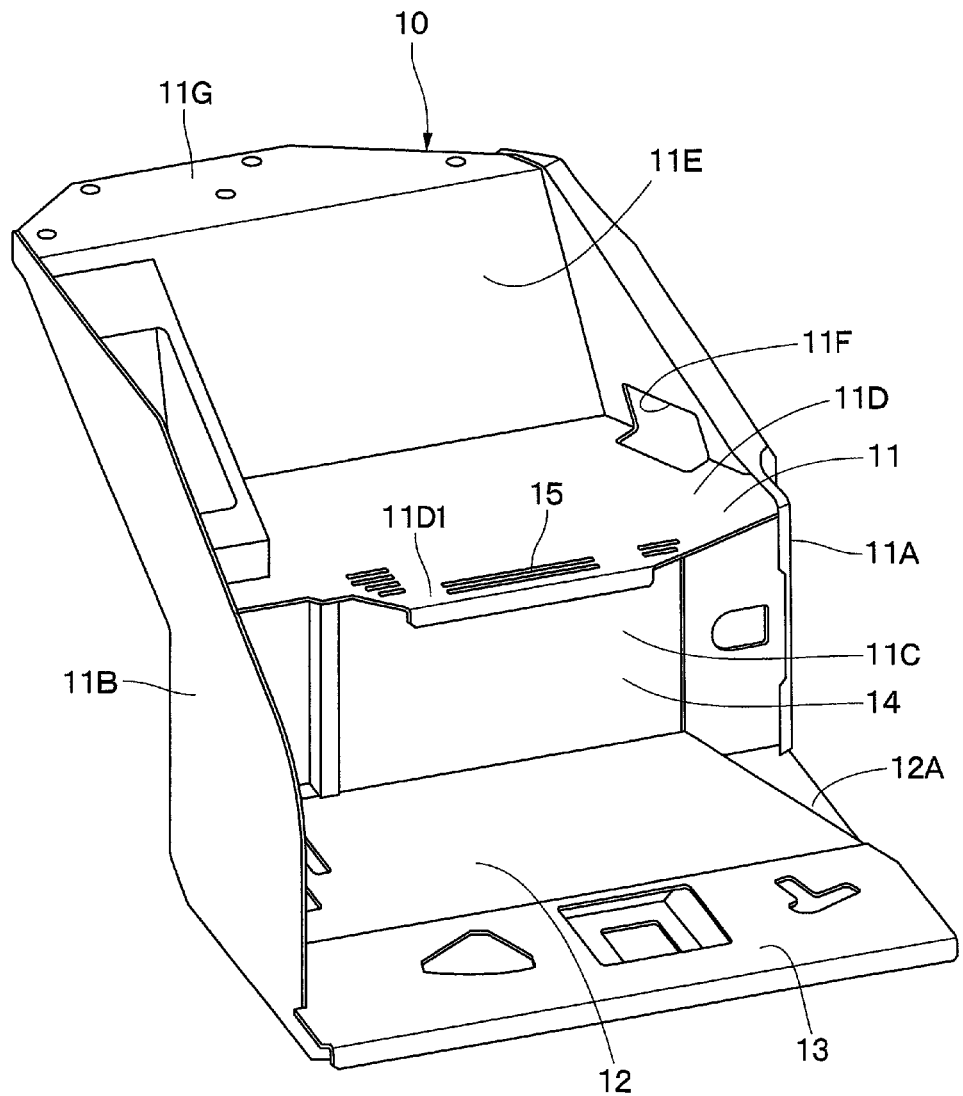
FIG. 9 is a perspective view of a single body floor member when seen from the front side.
Figure 10:
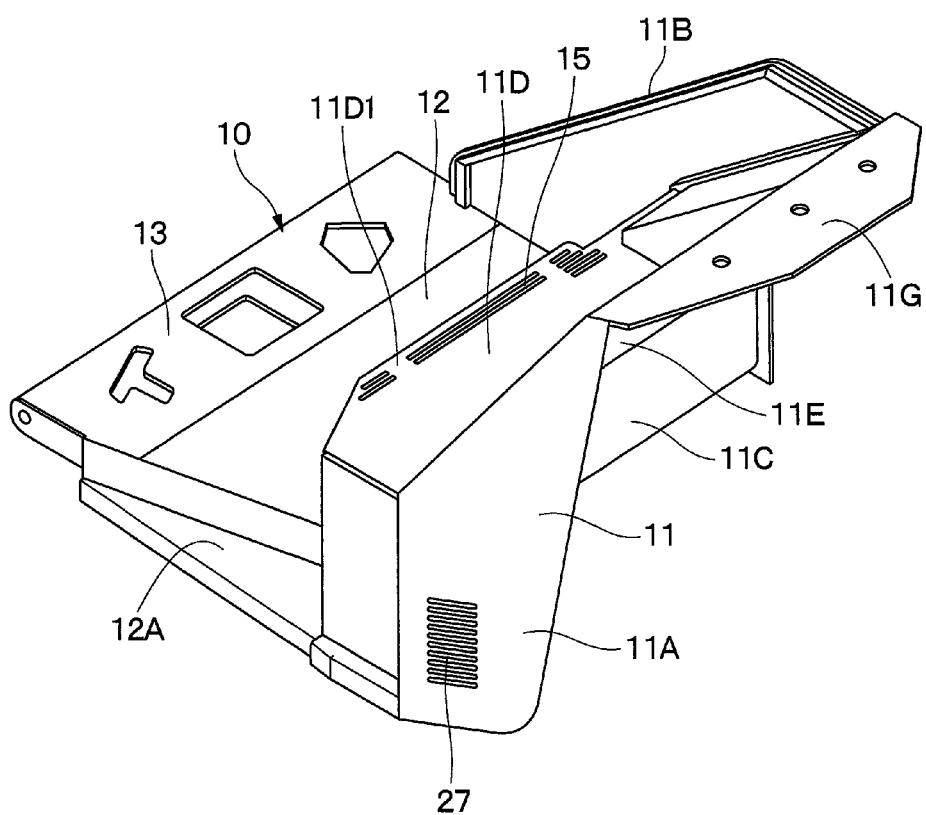
FIG. 10 is a perspective view of a single body floor member when seen from the rear side.

The seat base 11 is provided on the rear side of the floor member 10. On this seat base 11, the operator's seat 17 which will be described later is mounted on the upper side. As shown in FIGS. 8 to 10, the seat base 11 is composed of a left surface plate 11A located on the left side and installed upright so as to extend in the front-rear direction, a right surface plate 11B located on the right side and installed upright so as to extend in the front-rear direction, a laterally long rear surface plate 11C rising from a rear end of the footrest area 12 as the engine 7 side and extending in the left-right direction and closing a space between the left surface plate 11A and the right surface plate 11B, an operator's seat mounting plate 11D provided on an upper end of the rear surface plate 11C and extending in the front-rear direction and whose both ends in the left-right direction are supported by the side surface plates 11A and 11B, respectively, and a rear plate 11E extending to the upper side from a rear part of the operator's seat mounting plate 11D. Moreover, the operator's seat mounting plate 11D is formed as a flat plate extending in the horizontal direction, and the operator's seat 17 is mounted on the upper surface thereof.

Therefore, the seat base 11 is formed as a trapezoidal shape rising upward as a whole. Here, the lower side of the seat base 11 is sandwiched between the left and right surface plates 11A and 11B and has a space surrounded by the rear surface plate 11C, the operator's seat mounting plate 11D, and a rear position 12B of the footrest area 12. As described above, the space between the seat base 11 and the footrest area 12 is formed as a duct accommodating space 14 which will be described later. An indoor air suction port 15 which will be described later making an occupying space 21 and the duct accommodating space 14 communicate with each other is provided on a front end portion 11D1 of the operator's seat mounting plate 11D.

At a bent position between the left surface plate 11A and the operator's seat mounting plate 11D of the seat base 11, an opening portion 11F is provided, and a filter accommodating section 28A of the outdoor air inlet duct 28 which will be described later is mounted on the opening portion 11F by being directed upward. On the upper side of the rear plate 11E of the seat base 11, an extending portion 11G is provided extending to the rear side, and the extending portion 11G is provided on a support base (not shown) provided on the revolving frame 6 or on an upper part of the counterweight 5. Moreover, as shown in FIG. 10, an outdoor air inlet port 27 which will be described later and introduces the outside air (outdoor air) of the cab box 20 is provided on the left surface plate 11A of the seat base 11.

The footrest area 12 is on which the operator seated on the operator's seat 17 places the foot and is provided on the front side of the seat base 11. The footrest area 12 is formed as a flat plate body having a rectangular shape elongated in the left-right direction and its rear position 12B (See FIG. 8) enters the lower side of the seat base 11. A left end of the footrest area 12 located on a door 20F side of the cab box 20 which will be described later is an entrance surface portion 12A. This entrance surface portion 12A is lower than the footrest area 12 by one step so that the operator can place the foot when he/she gets on/off the occupying space 21.

The lever/pedal mounting section 13 is integrally provided on the front side of the footrest area 12, and the lever/pedal mounting section 13 is formed by a plate body extending in the left-right direction along the front end of the footrest area 12. An operating lever/pedal 19 for running which will be described later or the like is mounted on the lever/pedal mounting section 13.

The duct accommodating space 14 is provided on the front side of the seat base 11. As shown in FIGS. 8 and 9, the duct accommodating space 14 is located on the front side of the rear surface plate 11C of the seat base 11 and formed as a closed space extending in the vertical direction between the operator's seat mounting plate 11D and the rear position 12B of the footrest area 12. In this case, the duct accommodating space 14 is closed at both ends in the left-right direction by the left and right surface plates 11A and 11B. This duct accommodating space 14 is formed as a flat space section which is thin in the front-rear direction and extending in the left-right direction and vertical direction on the front side of the rear surface plate 11C and between the operator's seat mounting plate 11D and the rear position 12B of the footrest area 12. As a result, even if an installation space is limited as the occupying space 21 of the small-sized hydraulic excavator 1, the duct accommodating space 14 can be provided in the small occupying space 21. The duct accommodating space 14 can accommodate the indoor air inlet duct 23 and the indoor air filter 26 which will be described later in a vertically laid state.

In the duct accommodating space 14, a space between a rear surface of the front cover 16 and a front surface of the indoor air filter 26, which will be described later, is a filter front space portion 14A. This filter front space portion 14A is a space section through which the indoor air having passed the indoor air suction port 15 which will be described later flows toward the indoor air filter 26.

The indoor air suction port 15 is provided on the operator's seat mounting plate 11D of the seat base 11 (See, FIGS. 9 and 10). This indoor air suction port 15 is provided on the front end portion 11D1 of the operator's seat mounting plate 11D between the rear surface of the front cover 16 and the front surface of the indoor air filter 26 which will be described later. The indoor air suction port 15 is for allowing air in the occupying space 21 which will be described later to flow into the indoor air filter 26 and is formed as a plurality of slits extending in the left-right direction.

Here, as shown in FIG. 8, the indoor air suction port 15 is provided at a position higher than the footrest area 12 forming the floor surface of the occupying space 21 only by a height dimension H1. Therefore, even if fine sands, dusts and the like remain on the footrest area 12, since the sands, dusts and the like heavier than air cannot rise, it is difficult for them to enter the duct accommodating space 14 through the indoor air suction port 15 arranged at a high position. As a result, clogging of a suction surface of the indoor air filter 26 which will be described later by the sands, dusts and the like can be prevented.

Figure 4:
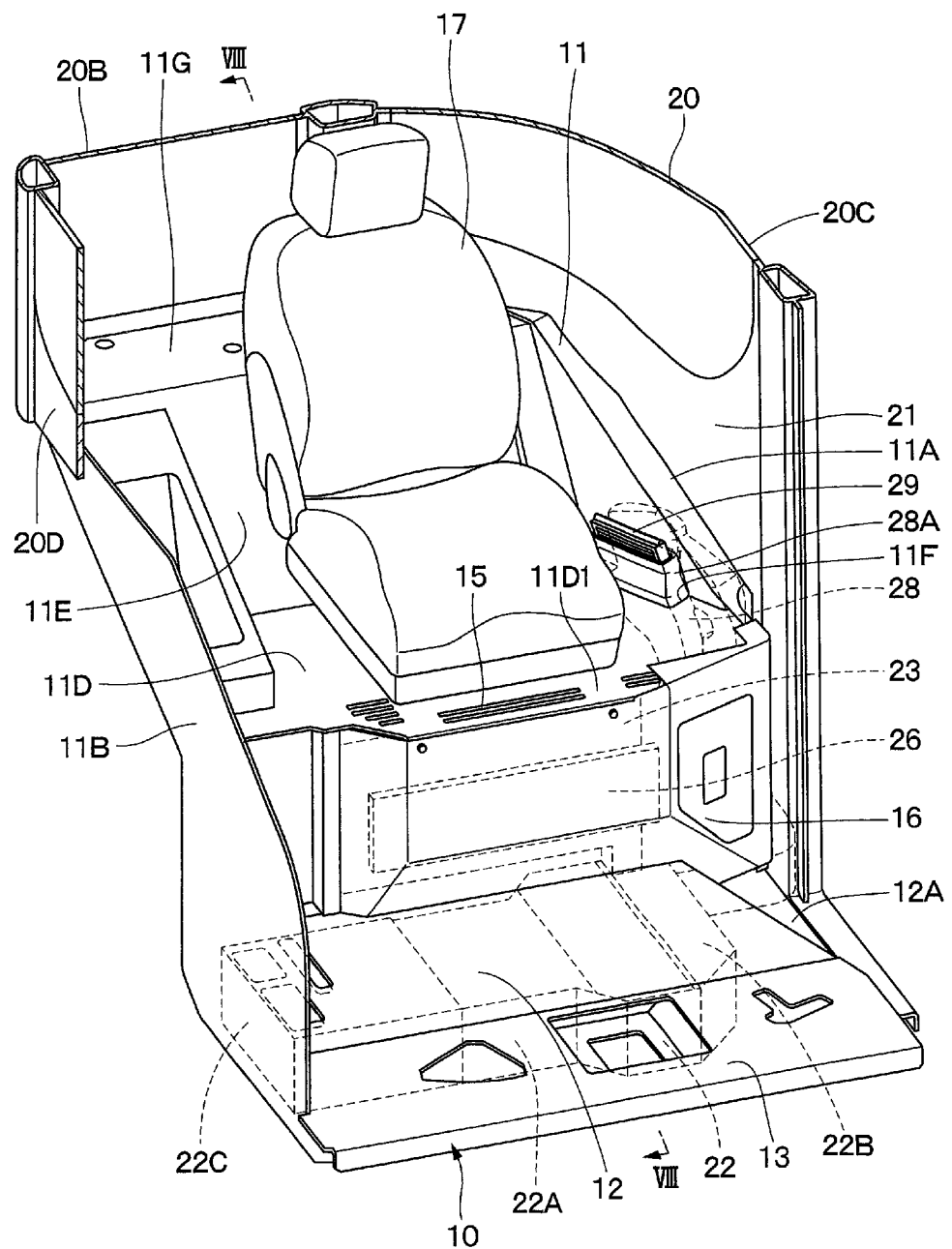
FIG. 4 is a partially broken perspective view of a floor member, a part of a cab box, an operator's seat, an indoor unit, each of inlet ducts, each of filters, and a front cover in an enlarged manner.
Figure 5:
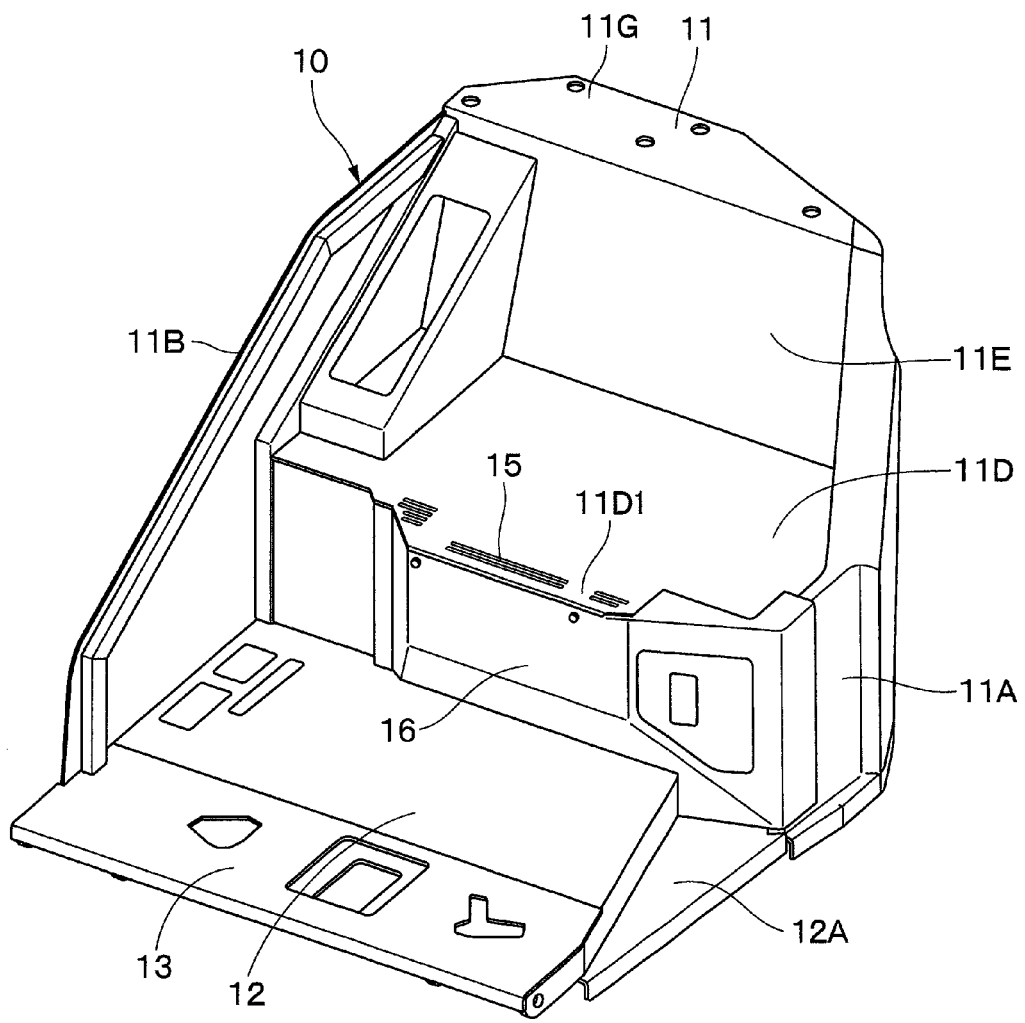
FIG. 5 is a perspective view of the floor member and the like when seen from the side opposite to FIG. 4 in the left-right direction in a state in which the cab box and the operator's seat are omitted.

The front cover 16 is provided on the front side of the seat base 11 (See, FIGS. 4 and 8). This front cover 16 covers and hides the indoor air inlet duct 23 and the indoor air filter 26, which will be described later, accommodated in the duct accommodating space 14 of the seat base 11 and is formed as a rectangular plate body elongated in the left-right direction and closing the front side of the duct accommodating space 14. The front cover 16 covers the front side of the indoor air filter 26 between the footrest area 12 and the operator's seat mounting plate 11D of the seat base 11. As a result, the front cover 16 can make the appearance on the front side of the seat base 11 favorable. Moreover, the front cover 16 can prevent sands and dusts floating up in the occupying space 21 from directly adhering to the indoor air filter 26.

The front cover 16 forms the filter front space portion 14A constituting a part of the duct accommodating space 14 between the rear surface of the front cover 16 and the front surface of the indoor air filter 26 by covering the front side of the indoor air filter 26. At a position communicating with the filter front space portion 14A, that is, the indoor air suction port 15 is provided on the front end portion 11D1 of the operator's seat mounting plate 11D of the seat base 11.

Figure 3:
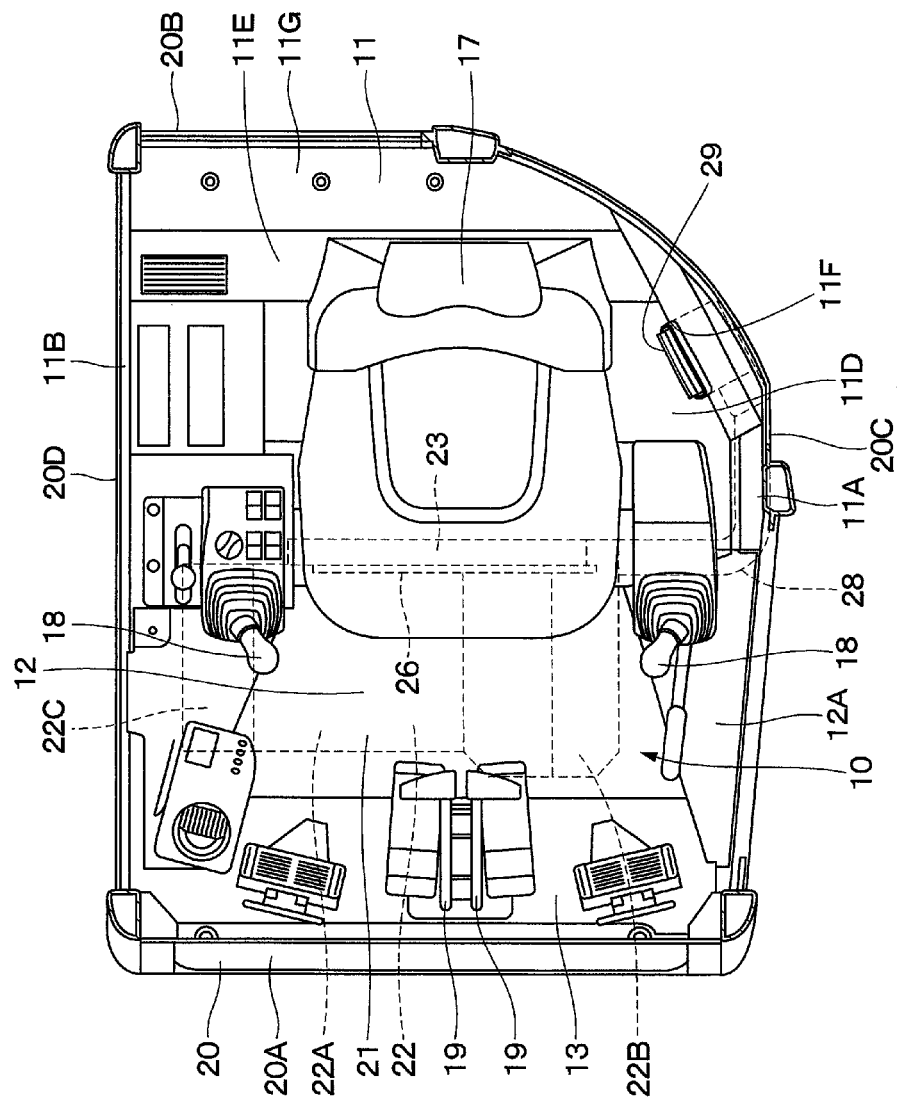
FIG. 3 is a cross sectional view of a structure in a cab when seen from an arrow direction in FIG. 1.

The operator's seat 17 is provided on the floor member 10, and as shown in FIG. 3 and the like, the operator's seat 17 is mounted at a center position in the left-right direction of the operator's seat mounting plate 11D constituting the seat base 11. This operator's seat 17 is on which the operator is seated when manipulating the hydraulic excavator 1. An perating lever 18 for a work for operating a working mechanism 4 and the like is disposed in the left and right side of the operator's seat 17, respectively. Moreover, the operating lever/pedals 19 and the like for running operated by a manual operation or a stepping-on operation when operating the lower traveling structure 2 to run are provided on the lever/pedal mounting section 13 on the front of the operator's seat 17.

The cab box 20 is provided on the floor member 10, and the cab box 20 covers the periphery and the upper part of the floor member 10. As shown in FIGS. 2 and 3, the cab box 20 is formed having a box shape by a front surface 20A, a rear surface 20B, a left surface 20C, a right surface 20D, and a top surface 20E and has a lower end portion mounted on a peripheral edge of the floor member 10. As a result, the cab box 20 forms the occupying space 21 which becomes an occupying space of the operator on the floor member 10. The door 20F for opening/closing an entrance is rotatably provided on the left surface 20C of the cab box 20.

Subsequently, the indoor unit 22 of the air-conditioning unit provided on the floor member 10, each of the inlet ducts 23 and 28, and each of the filters 26 and 29 will be described.

Designated at 22 is the indoor unit of the air-conditioning unit (See, FIGS. 7 and 8), and the indoor unit 22 is mounted on the back surface side of the footrest area 12 of the floor member 10. This indoor unit 22 sucks the indoor air in the cab box 20 or the outside air which is the atmospheric air and supplies it to the occupying space 21 in the cab box 20 as conditioned air conditioned to desired temperature and humidity.

Figure 12:
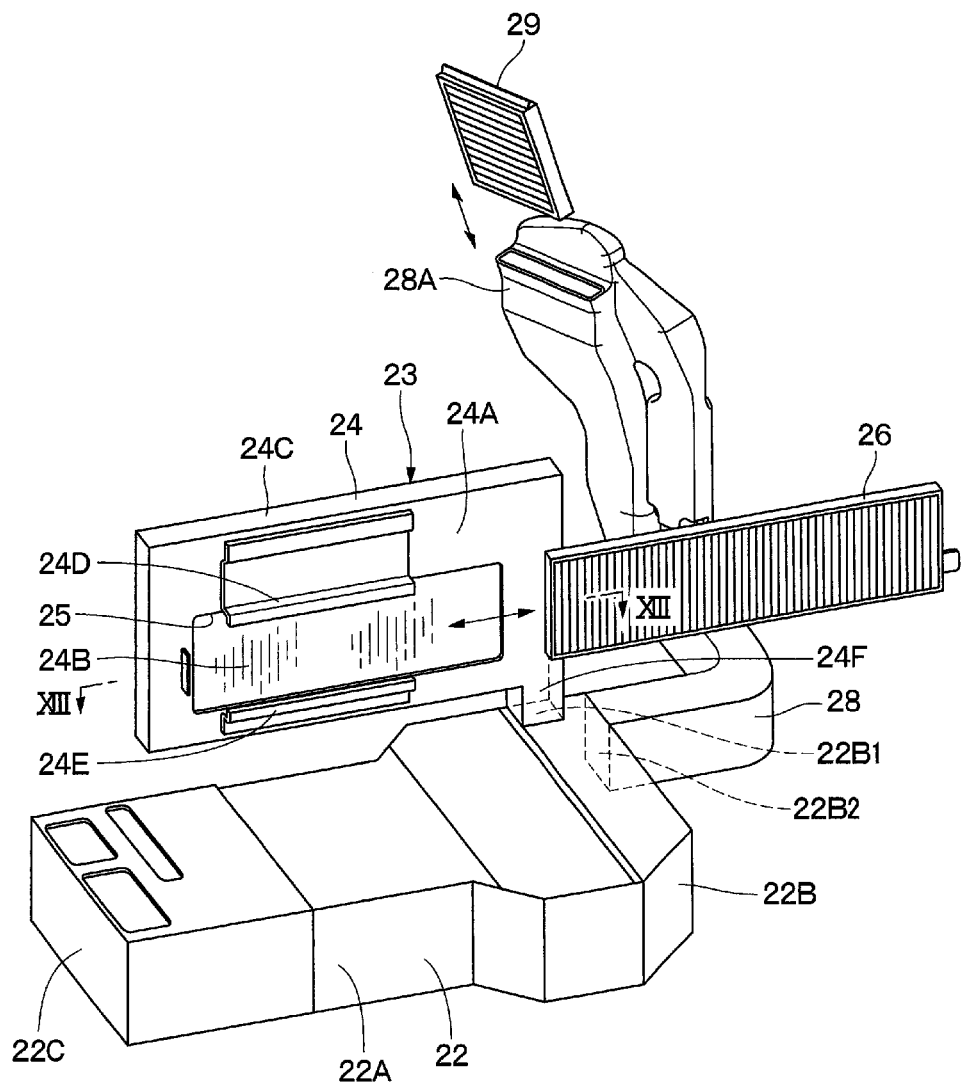
FIG. 12 is an exploded perspective view of a state in which the indoor air filter is removed from the indoor air inlet duct and the outdoor air filter is removed from the outdoor air inlet duct when seen from a position similar to that in FIG. 11.

As shown in FIG. 12, the indoor unit 22 accommodates a blower fan, an evaporator, a heater core (none of them is shown) and the like in a casing 22A having a box shape extending in the left-right direction. An inlet side connecting portion 22B is provided on the left side which is the upstream side of the casing 22A, and in this inlet side connecting portion 22B, a switching mechanism (not shown) for switching between the indoor air and the outdoor air is incorporated. In the inlet side connecting portion 22B, an indoor air inlet duct connecting portion 22B1 to which the indoor air inlet duct 23 which will be described later is connected and an outdoor air inlet duct connecting portion 22B2 to which the outdoor air inlet duct 28 is connected are provided. On the other hand, on the right side which is the downstream side of the casing 22A, an outlet side connecting portion 22C is provided, and an air conditioning duct (not shown) for supplying the conditioned air into the occupying space 21 is connected to the outlet side connecting portion 22C.

Figure 6:
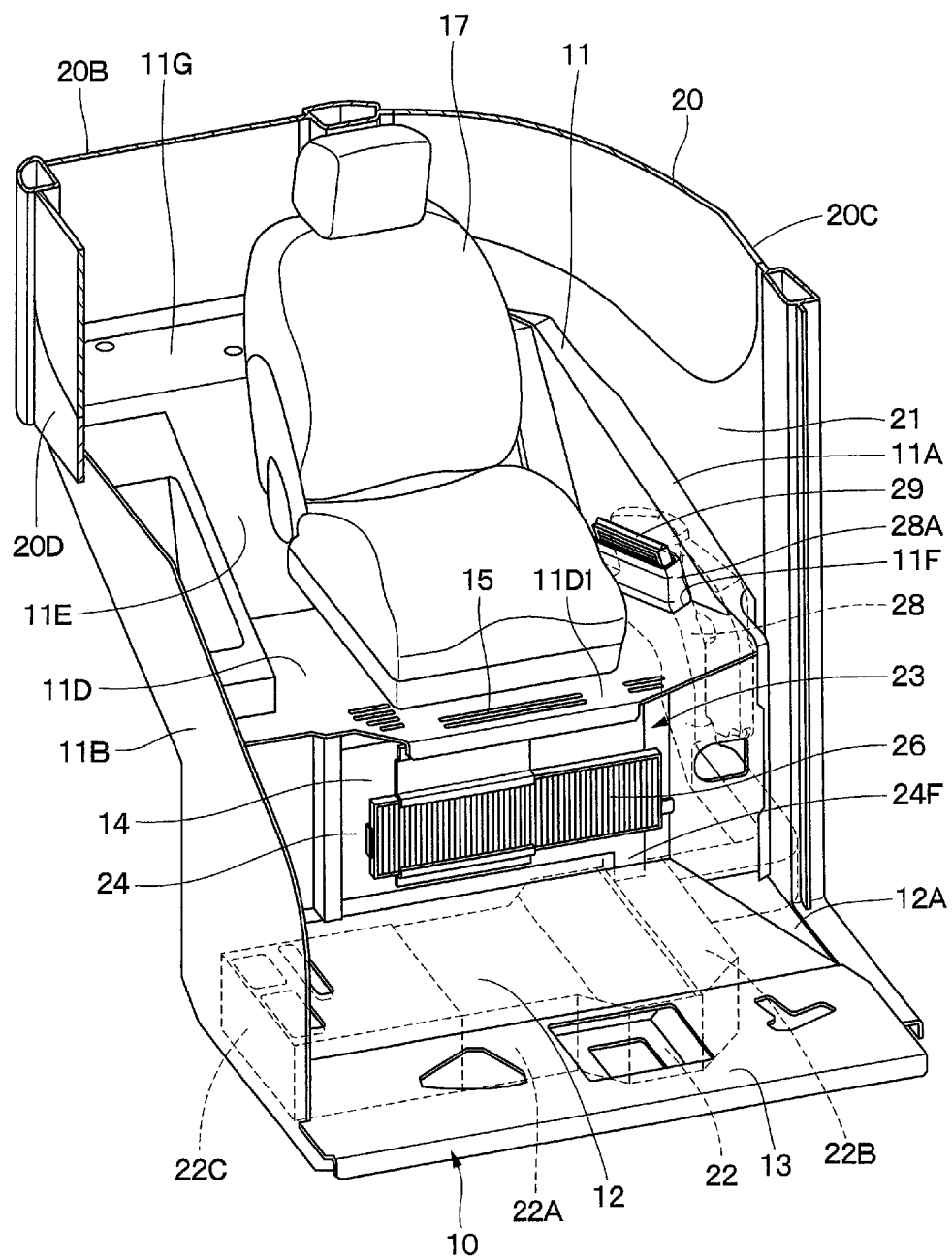
FIG. 6 is a partially broken perspective view illustrating a state in which the front cover is removed from FIG. 4.
Figure 7:
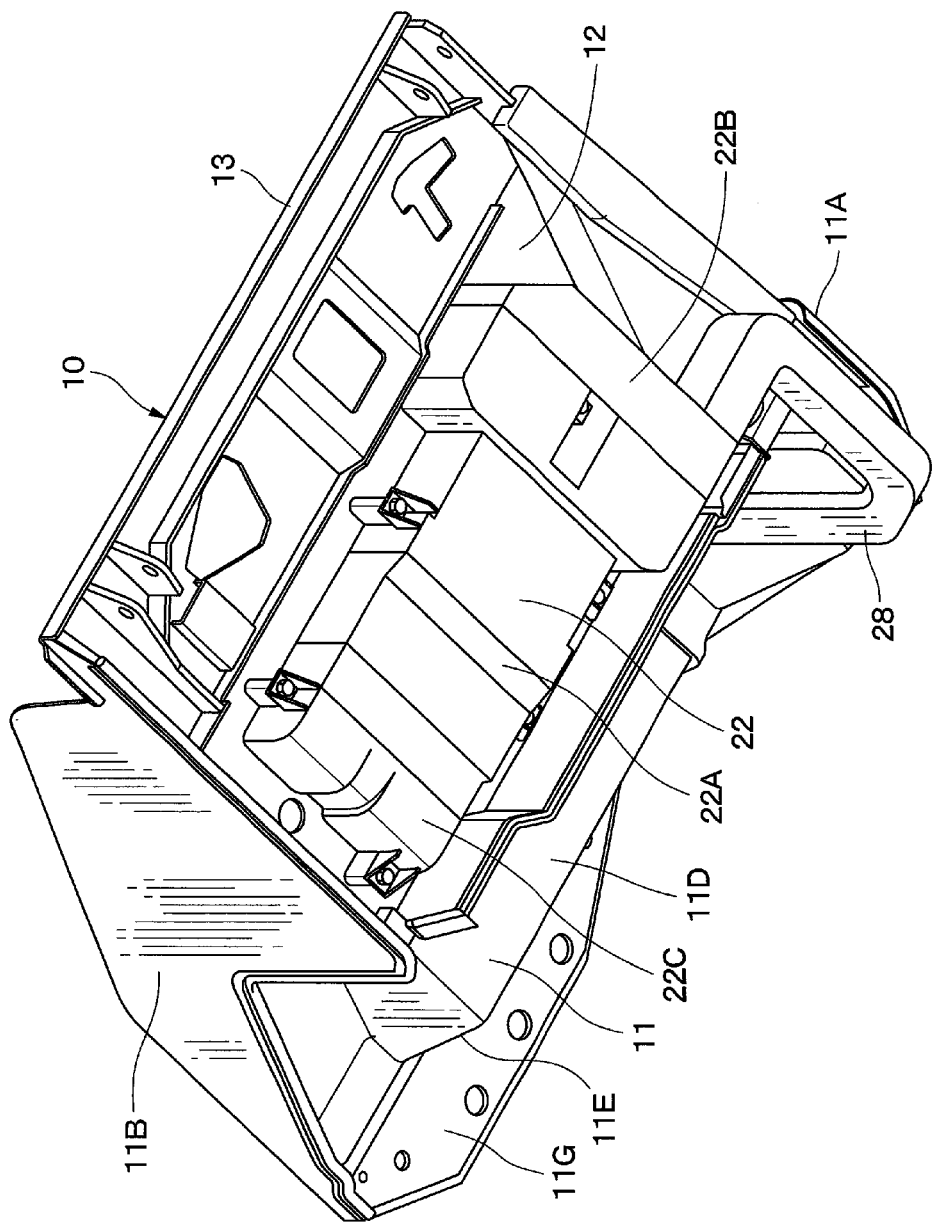
FIG. 7 is a perspective view of a mounted state of the indoor unit and the like with respect to the floor member when seen from the back surface side.
Figure 11:
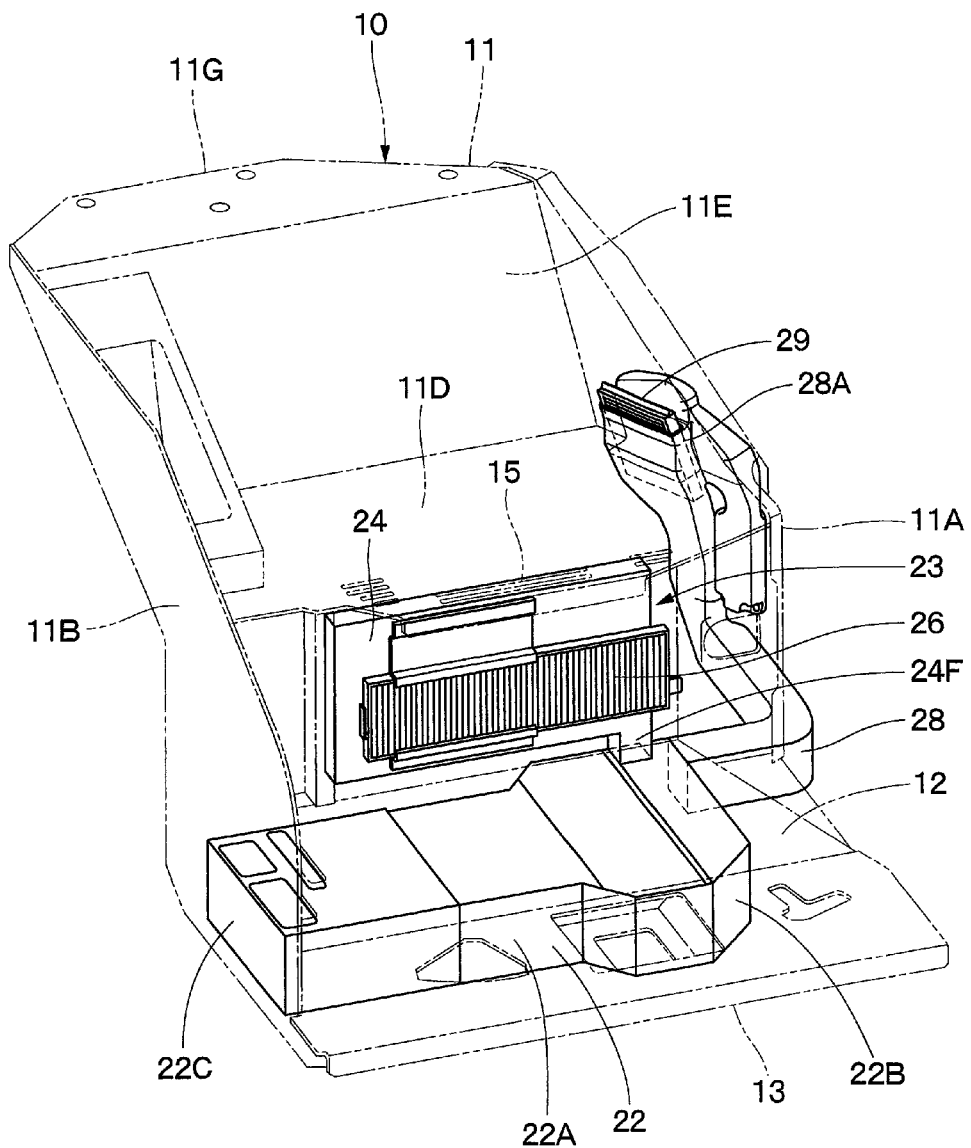
FIG. 11 is a perspective view illustrating the indoor unit, the indoor air inlet duct, the indoor air filter, an outdoor air inlet duct, an outdoor air filter and the like in an assembled state.
Figure 13:
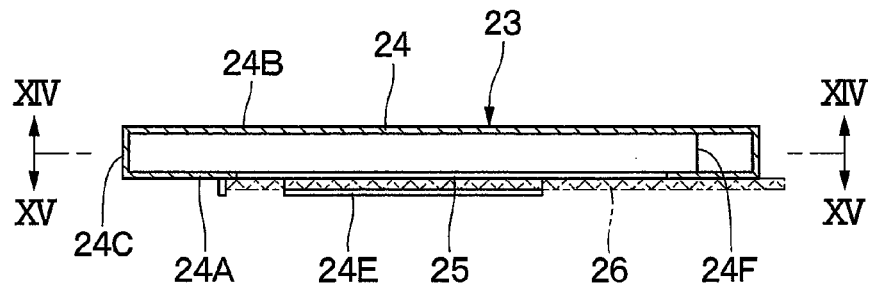
FIG. 13 is an enlarged sectional view of the indoor air inlet duct when seen from an arrow XIII-XIII direction in FIG. 12.
Figure 14:
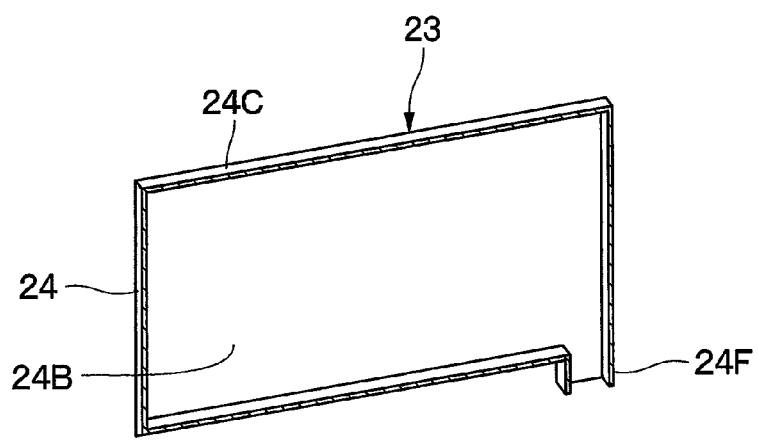
FIG. 14 is a sectional view of the indoor air inlet duct when seen from an arrow XIV-XIV direction in FIG. 13.

Designated at 23 is the indoor air inlet duct which is a featured portion of the first embodiment, and the indoor air inlet duct 23 is located on the front side of the rear surface plate 11C of the seat base 11 and provided in the duct accommodating space 14 of the seat base 11 (See, FIG. 6). As shown in FIGS. 11, 12, and 13, this indoor air inlet duct 23 is a cuboid hollow container which is lengthy in the vertical direction and the left-right direction and short in the front-rear direction. That is, the indoor air inlet duct 23 is composed of a box body 24 which is flat in the front-rear direction and a filter fitting hole 25 provided by being opened on the front surface side of the box body 24. The indoor air inlet duct 23 is disposed in the vertically laid state extending in the perpendicular direction by arranging the box body 24 forming the outer shape so as to rise to be lengthy in the left-right direction.

Here, as illustrated in FIGS. 12 to 15, the box body 24 is composed of a front surface plate 24A formed having a rectangular shape lengthy in the left-right direction, a rear surface plate 24B having a rectangular shape faced with the front surface plate 24A at an interval, and a peripheral surface plate 24C having a rectangular frame shape closing a space between the front surface plate 24A and the rear surface plate 24B. Filter guides 24D and 24E are provided on the front surface plate 24A so as to vertically sandwich the filter fitting hole 25 which will be described later, and each of the filter guides 24D and 24E holds the indoor air filter 26 which will be described later, capable of insertion/removal in the left-right direction with respect to the filter fitting hole 25.

An indoor air outlet port 24F is provided in the box body 24 by being located on the lower left side. This indoor air outlet port 24F is connected to the indoor air inlet duct connecting portion 22B1 forming the inlet side connecting portion 22B of the indoor unit 22. The indoor air outlet port 24F is formed having a square tube shape extending in the vertical direction and can supply the indoor air sucked into the box body 24 through the filter fitting hole 25 into the indoor unit 22.

Figure 15:
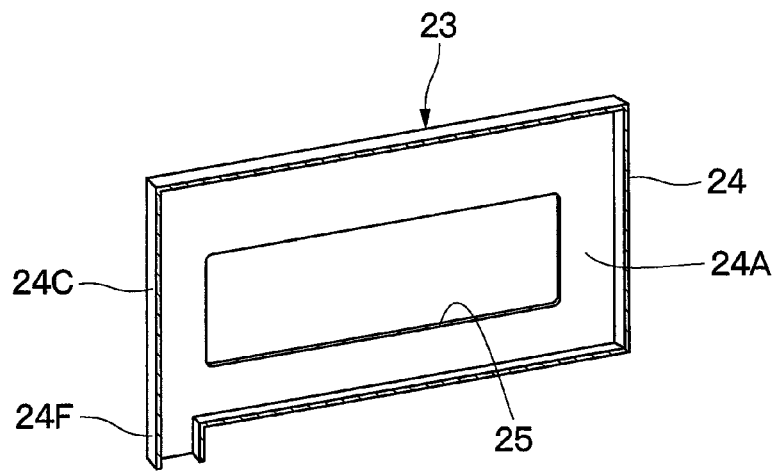
FIG. 15 is a sectional view of the indoor air inlet duct when seen from an arrow XV-XV direction in FIG. 13.

The filter fitting hole 25 is provided by being opened in the front surface plate 24A of the box body 24, and the filter fitting hole 25 serves as an inlet port for having the indoor air flow into a ventilation path inside the indoor air inlet duct 23. As shown in FIGS. 12 and 15, the filter fitting hole 25 is formed as a laterally long opening opened toward the front.

Here, since the indoor air inlet duct 23 has the filter fitting hole 25 opened on the front surface plate 24A which is a perpendicular surface, the indoor air filter 26 can be mounted in this filter fitting hole 25 in the vertically laid state in which the suction surface is oriented perpendicularly. Moreover, since the filter fitting hole 25 is provided in the duct accommodating space 14, the filter fitting hole 25 can be arranged at a position higher than the footrest area 12 which is the floor plate of the occupying space 21. As described above, in a state in which the filter fitting hole 25 is arranged at a higher position in the duct accommodating space 14, it can be made difficult for fine sands, dusts and the like remaining and floating over the footrest area 12 to be sucked through the filter fitting hole 25.

The indoor air filter 26 is provided capable of being mounted on/removed from the indoor air inlet duct 23. The indoor air filter 26 catches foreign substances such as fine sands, dusts and the like in the indoor air introduced into the indoor air inlet duct 23. Since the indoor air filter 26 is arranged in a vertically laid state in which the suction surface catching foreign substances is oriented perpendicularly in the filter fitting hole 25 of the indoor air inlet duct 23, the indoor air filter 26 can be accommodated in the small duct accommodating space 14. Specifically, the indoor air filter 26 is formed having a rectangular shape lengthy in the left-right direction so as to cover the filter fitting hole 25 and is detachably held along the filter guides 24D and 24E.

The indoor air filter 26 covers the filter fitting hole 25 of the box body 24 arranged at a position higher than the footrest area 12, and thus, as shown in FIG. 8, the lower end of this indoor air filter 26 is arranged at a position higher than the upper surface of the footrest area 12 only by a height dimension H2. Therefore, adhesion of fine sands, dusts and the like to the indoor air filter 26 can be prevented, and progress of clogging of the indoor air filter 26 can be delayed.

The outdoor air inlet port 27 is provided on the left surface plate 11A of the seat base 11 (See, FIG. 10), and the outdoor air inlet port 27 is opened on the outside of the cab box 20. This outdoor air inlet port 27 is formed as a rectangular opening lengthy in the vertical direction by juxtaposing a plurality of slits extending in the lateral direction in the vertical direction, for example, and the upstream side of the outdoor air inlet duct 28 which will be described later is arranged by facing with that.

The outdoor air inlet duct 28 is provided on the floor member 10. This outdoor air inlet duct 28 connects the outdoor air inlet port 27 of the seat base 11 to the outdoor air inlet duct connecting portion 22B2 of the inlet side connecting portion 22B of the indoor unit 22, and a filter accommodating section 28A is provided in the middle portion so as to protrude upward from the opening portion 11F of the seat base 11. The outdoor air inlet duct 28 supplies the outdoor air introduced through the outdoor air inlet port 27 toward the indoor unit 22.

The outdoor air filter 29 is accommodated in the filter accommodating section 28A of the outdoor air inlet duct 28, capable of being mounted/removed. This outdoor air filter 29 catches foreign substances in the outdoor air flowing through the outdoor air inlet duct 28 toward the indoor unit 22.

The hydraulic excavator 1 according to the first embodiment has the configuration as described above, and subsequently, its operation will be described.

The operator who gets on the occupying space 21 in the cab box 20 and is seated on the operator's seat 17 operates the operating lever/pedals 19 for running so as to make the lower traveling structure 2 run. On the other hand, by operating the left and right operating levers 18 for work, the working mechanism 4 and the like are operated, and an excavating work of earth and sands or the like can be performed.

During the work of the above described hydraulic excavator 1, in order to make the environment of the occupying space 21 favorable, the indoor unit 22 of the air-conditioning unit and the like are operated. At this time, the indoor unit 22 sucks the indoor air in the cab box 20 or the outdoor air outside, cools this air in the evaporator in the casing 22A or heats it by the heater core to make it the conditioned air. The indoor unit 22 can condition the inside of the occupying space 21 to an appropriate temperature by blowing out the conditioned air into the occupying space 21.

Here, the hydraulic excavator 1 is for performing a work at a working site where sands, dusts and the like float up, and thus, fine sands and dusts enter the cab box 20. The sands and dusts having entered the occupying space 21 in the cab box 20 remain on the footrest area 12 of the floor member 10 or are deposited. In this case, if the indoor unit 22 is operated with indoor air circulation, the indoor air inlet duct 23 sucks fine sands and dusts floating over the footrest area 12 together with the indoor air, and thus, it is concerned that sands and dusts in a large quantity adhere to the indoor air filter 26.

According to the first embodiment, by effectively using a space between the operator's seat mounting plate 11D of the seat base 11 and the rear position 12B of the footrest area 12 in the limited occupying space 21, the duct accommodating space 14 can be provided in the vertical direction. The indoor air inlet duct 23 having the front surface side opened as the filter fitting hole 25 is provided in this duct accommodating space 14, and the indoor air filter 26 is configured to be provided on the front surface plate 24A of the box body 24 of this indoor air inlet duct 23 so as to cover the filter fitting hole 25.

Since the indoor air filter 26 provided in the duct accommodating space 14 is arranged having its lower end at a position higher than the footrest area 12 only by the height dimension H2, adhesion of fine sands, dusts and the like to the indoor air filter 26 can be prevented, and clogging of the indoor air filter 26 by the sands, dusts and the like remaining on the footrest area 12 can be prevented.

As a result, since clogging of the indoor air filter 26 can be prevented, a frequency of a maintenance work such as clogging inspection, cleaning of adhering objects and the like of this indoor air filter 26 can be reduced, and workability of the hydraulic excavator 1 can be improved.

In the small-sized hydraulic excavator 1, the occupying space 21 is small, and an installation space for air conditioning related components is limited. Even in this case, the duct accommodating space 14 can be formed by using a space in the vertical direction among the rear surface plate 11C, the operator's seat mounting plate 11D, and the rear position 12B of the footrest area 12, and the indoor air inlet duct 23 and the indoor air filter 26 can be arranged in this duct accommodating space 14. Moreover, the indoor air filter 26 is mounted in the indoor air inlet duct 23 in the vertically laid state in which the sucked surface is oriented perpendicularly, and thus, this indoor air inlet duct 23 and the indoor air filter 26 can be also arranged in a slight installation space like the duct accommodating space 14.

Since the front cover 16 covering the front side of the indoor air filter 26 is provided on the front side of the seat base 11 between the operator's seat mounting plate 11D of the seat base 11 and the footrest area 12, the indoor air filter 26 and the indoor air inlet duct 23 can be covered, and appearance can be made favorable. The front cover 16 can prevent sands and dusts floated up in the occupying space 21 from directly adhering to the indoor air filter 26. In addition, since the left and right surface plates 11A and 11B supporting the both ends in the left-right direction of the operator's seat mounting plate 11D are provided on the seat base 11, strength of the seat base 11 can be improved. The left and right surface plates 11A and 11B can shut off sands, dusts and the like entering from the left-right direction of the duct accommodating space 14.

Moreover, in the first embodiment, the indoor air suction port 15 opened in the filter front space portion 14A between the rear surface of the front cover 16 and the front surface of the indoor air filter 26 is configured to be provided on the front end portion 11D1 of the operator's seat mounting plate 11D. As a result, the air in the occupying space 21 can be made to flow in toward the indoor air filter 26 through the filter front space portion 14A from the indoor air suction port 15 of the operator's seat mounting plate 11D. On the other hand, since sands, dusts and the like heavier than air cannot pass the indoor air suction port 15 at a position higher than the footrest area 12 only by the height dimension H1, the sands, dusts and the like can be prevented from entering the duct accommodating space 14. As a result, clogging of the indoor air filter 26 can be prevented for a long time.

On the other hand, the indoor unit 22 of the air-conditioning unit can be mounted by using a space under the floor on the back surface side of the footrest area 12 of the floor member 10, and the indoor unit 22 can be mounted on the floor member 10 of the small-sized hydraulic excavator 1.

Moreover, since the indoor air inlet duct 23 is composed of the box body 24 and the filter fitting hole 25, the indoor air inlet duct 23 can supply the indoor air having passed through the indoor air filter 26 to the indoor air inlet duct connecting portion 22B1 of the inlet side connecting portion 22B of the indoor unit 22 by making the indoor air flow into the box body 24 through the filter fitting hole 25.

Subsequently, FIGS. 16 to 22 illustrate a second embodiment of the present invention. A feature of the second embodiment is that a reinforcing connecting pipe for reinforcing the floor member is provided between the box body of the indoor air inlet duct and the indoor air inlet duct connecting portion of the indoor unit, and the indoor air inlet duct is configured to be connected to the indoor air inlet duct connecting portion of the indoor unit through the reinforcing connecting pipe. It should be noted that, in the second embodiment, component elements that are identical to those in the foregoing first embodiment will be simply denoted by the same reference numerals to avoid repetitions of similar explanations.

Figure 16:
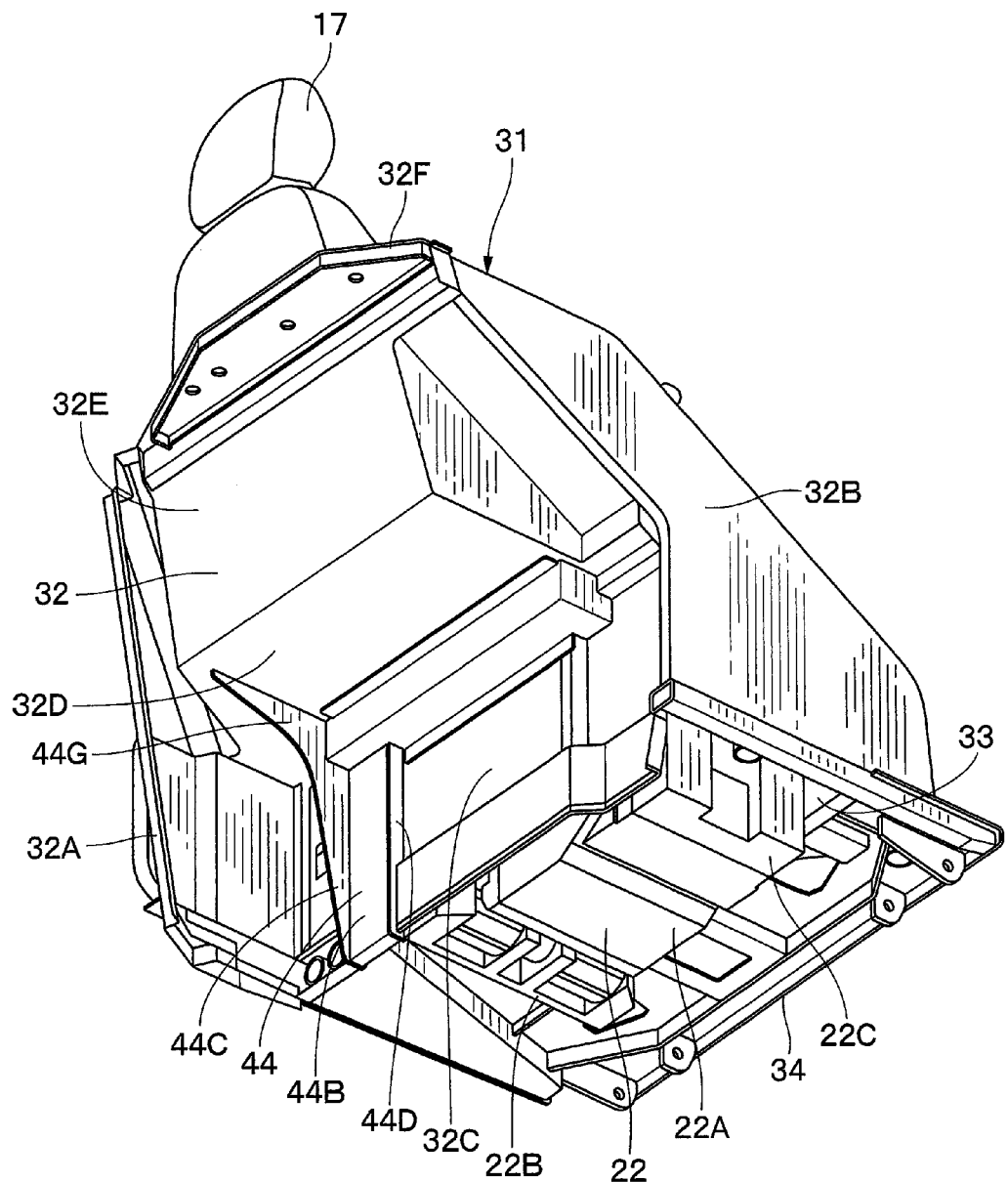
FIG. 16 is a perspective view of the floor member, the operator's seat, the indoor unit, and a reinforcing connecting pipe according to a second embodiment of the present invention when seen from the rear side.

In FIG. 16, designated at 31 is the floor member according to the second embodiment. This floor member 31 is composed of a seat base 32, a footrest area 33, a lever/pedal mounting section 34 and the like substantially similarly to the floor member 10 according to the above described first embodiment.

Designated at 32 is the seat base according to the second embodiment provided on the rear side of the floor member 31 and on which the operator's seat 17 is mounted on the upper side. As shown in FIGS. 17 to 21, this seat base 32 is composed of a left surface plate 32A, a right surface plate 32B, a rear surface plate 32C, an operator's seat mounting plate 32D, a rear plate 32E, and an extending portion 32F substantially similarly to the seat base 11 according to the above described first embodiment. However, the seat base 32 according to the second embodiment is different from the seat base 11 according to the first embodiment in a point in which an indoor air inlet duct 38 which will be described later is connected to the indoor unit 22 through a reinforcing connecting pipe 44.

The footrest area 33 is on which the operator seated on the operator's seat 17 places the foot and is provided on the front side of the seat base 32. A left end of the footrest area 33 is an entrance surface portion 33A lower by one step so that the operator can place the foot. The lever/pedal mounting section 34 is provided on the front side of the footrest area 33, and the operating lever/pedals 19 for running and the like are mounted on the lever/pedal mounting section 34.

Figure 20:
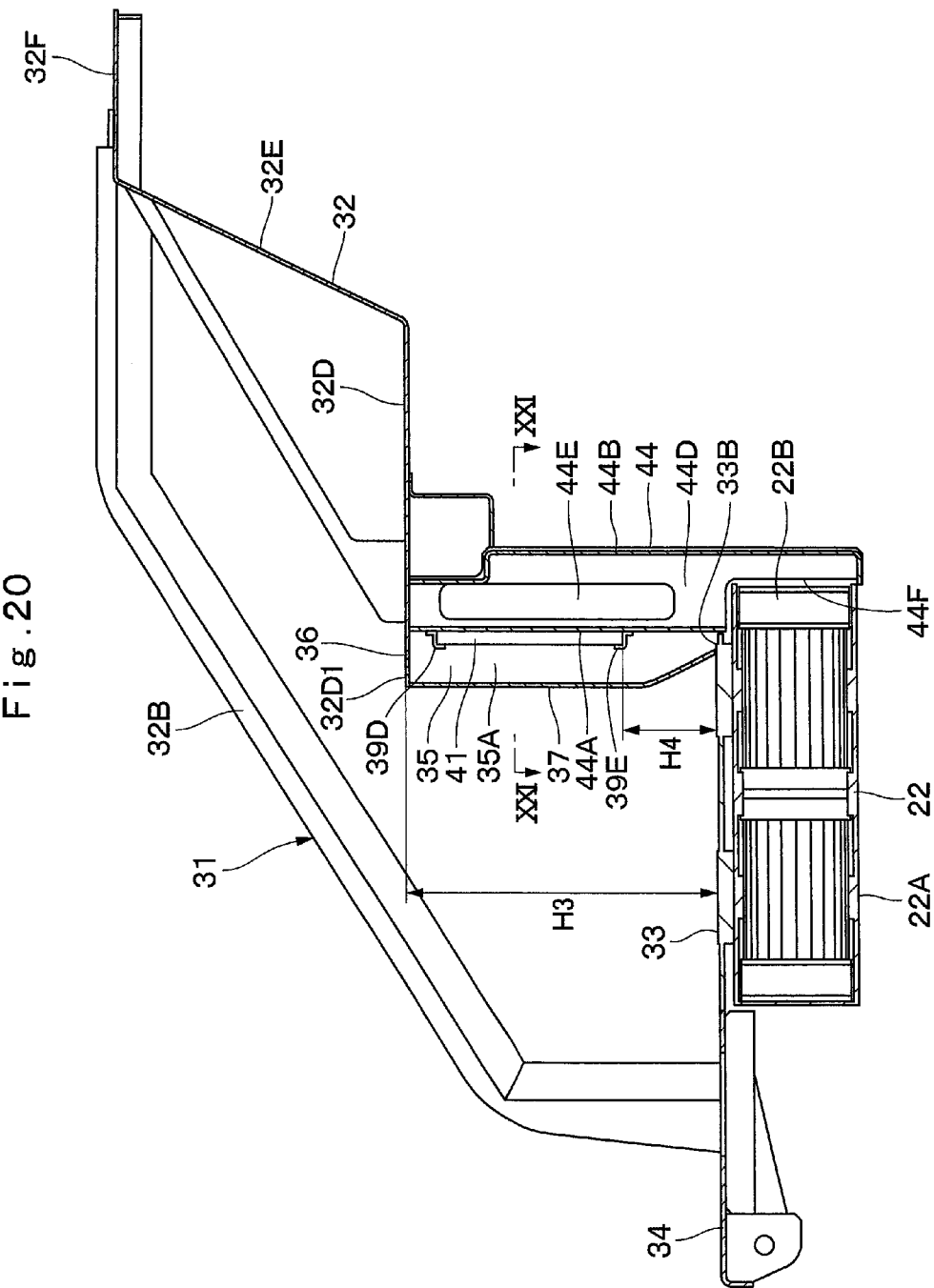
FIG. 20 is an enlarged sectional view of the floor member, the indoor unit, the indoor air inlet duct, the indoor air filter, the front cover, and the reinforcing connecting pipe when seen from an arrow XX-XX direction in FIG. 17.

A duct accommodating space 35 is provided on the front side of the seat base 32, and as shown in FIG. 20, the duct accommodating space 35 is formed as a space extending in the vertical direction among the rear surface plate 32C, the operator's seat mounting plate 32D, and a rear position 33B of the footrest area 33. In the duct accommodating space 35, a space between the rear surface of a front cover 37 which will be described later and the front surface of an indoor air filter 41 is a filter front space portion 35A.

An indoor air suction port 36 is provided on a front end portion 32D1 of the operator's seat mounting plate 32D of the seat base 32. The indoor air suction port 36 is arranged at a position higher than the footrest area 33 only by a height dimension H3 substantially similarly to the indoor air suction port 15 according to the above described first embodiment.

The front cover 37 is provided on the front side of the seat base 32. This front cover 37 covers and hides the indoor air inlet duct 38 accommodated in the duct accommodating space 35 of the seat base 32 and the indoor air filter 41 substantially similarly to the front cover 16 according to the first embodiment and is formed having a rectangular shape lengthy in the left-right direction.

Subsequently, a configuration of the indoor air inlet duct 38 which is the feature portion according to the second embodiment will be described by referring to FIGS. 18 to 22.

Figure 18:
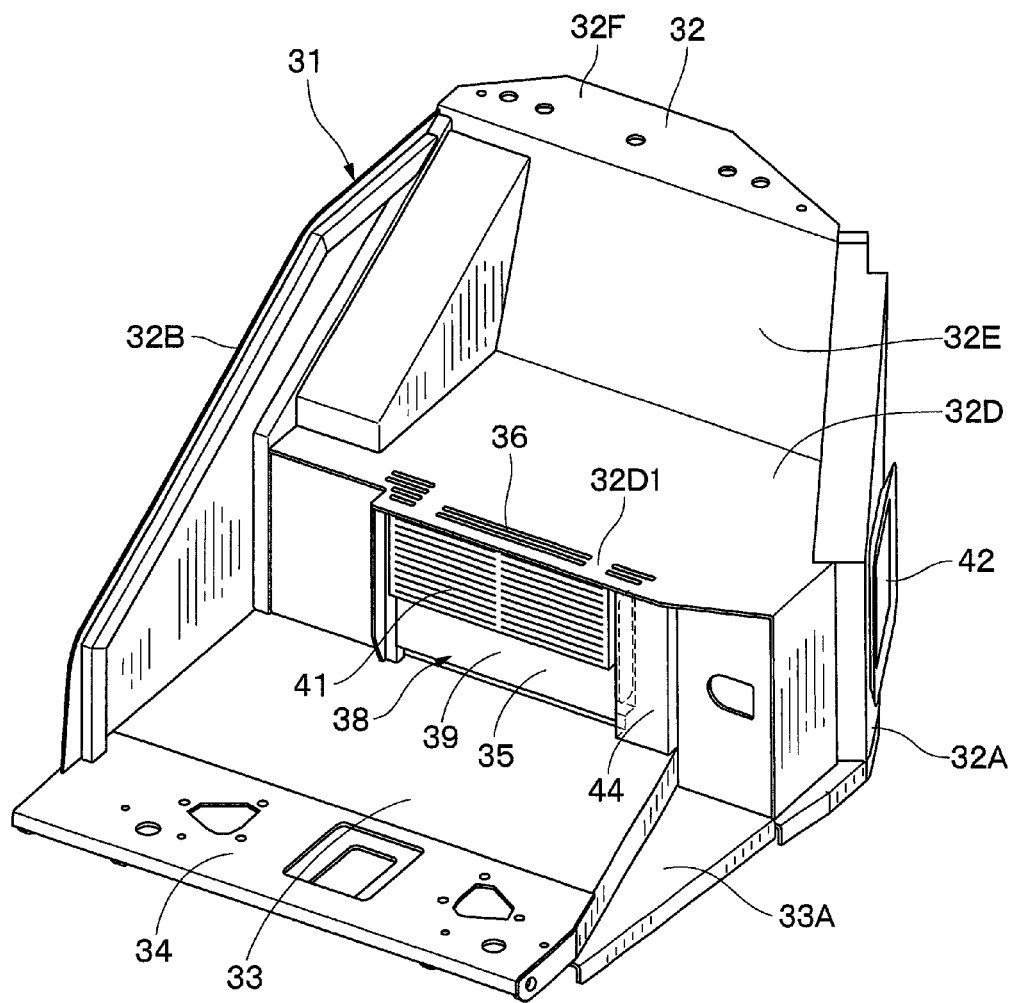
FIG. 18 is a perspective view of the floor member, the indoor air filter and the like in a state in which the front cover is removed from the seat base when seen from a position similar to that in FIG. 17.
Figure 19:
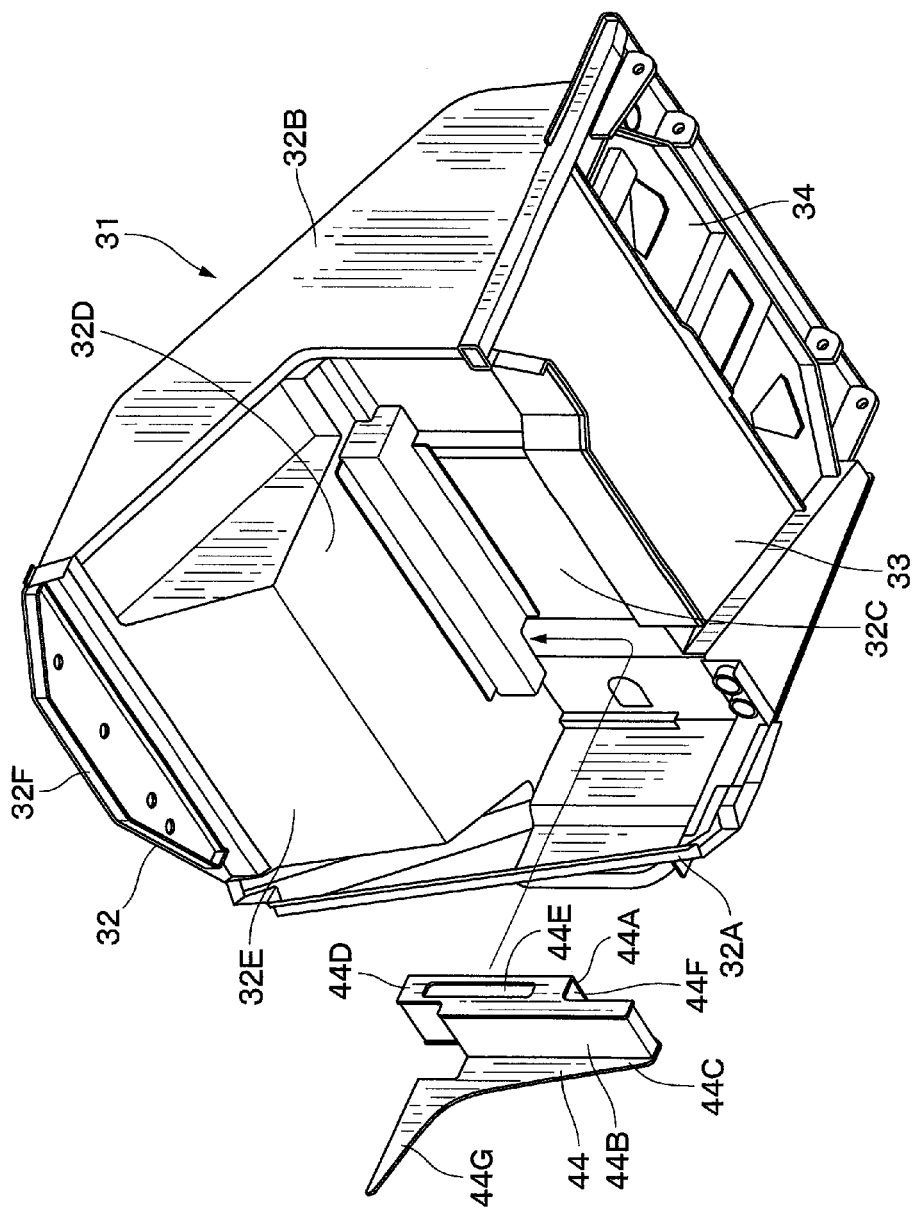
FIG. 19 is an exploded perspective view of the floor member and the reinforcing connecting pipe in an exploded state when seen from the rear side.
Figure 22:
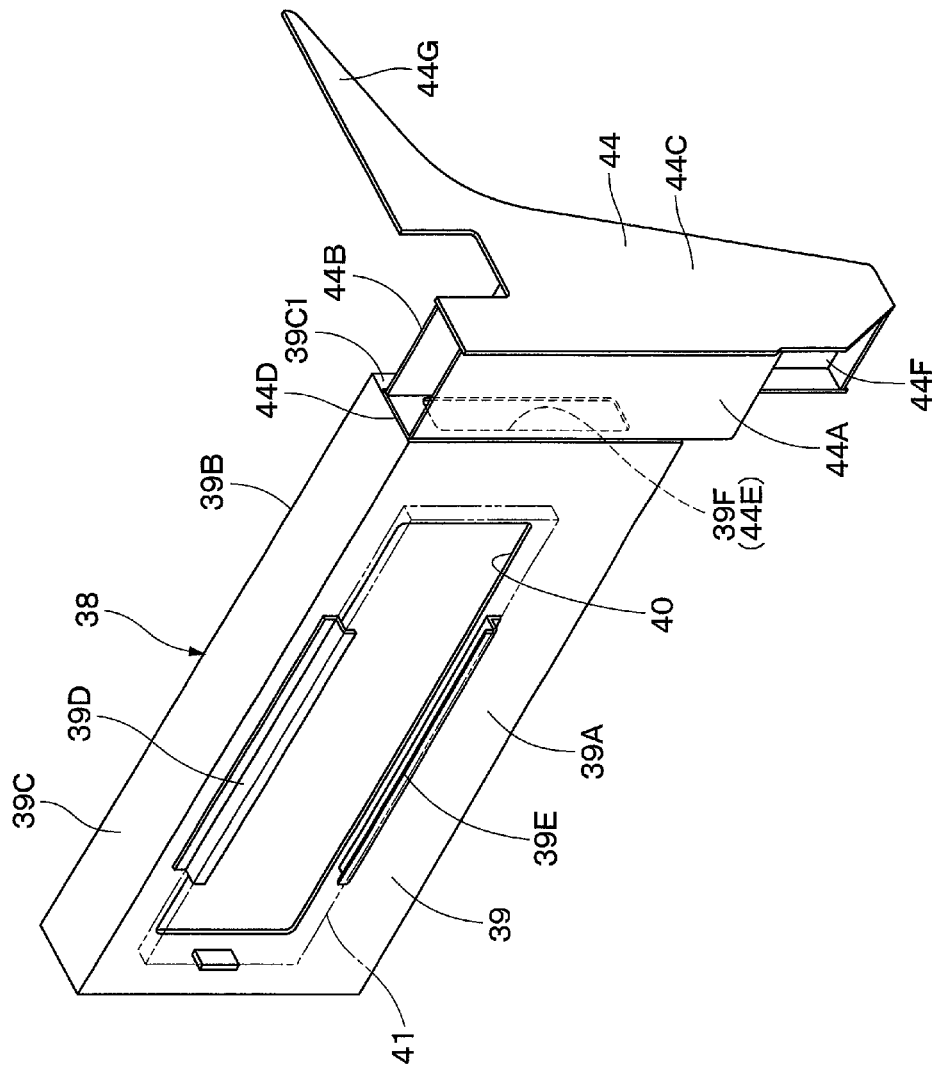
FIG. 22 is a perspective view illustrating the indoor air inlet duct and the reinforcing connecting pipe.

Designated at 38 is the indoor air inlet duct according to the second embodiment provided in the duct accommodating space 35 of the seat base 32. As shown in FIGS. 18, 22 and the like, this indoor air inlet duct 38 is composed of a box body 39 and a filter fitting hole 40 substantially similarly to the indoor air inlet duct 23 according to the first embodiment. However, the indoor air inlet duct 38 according to the second embodiment is different from the indoor air inlet duct 23 according to the first embodiment in a point in which the indoor air inlet duct 38 is configured to be connected to the indoor air inlet duct connecting portion 22B1 of the indoor unit 22 through a reinforcing connecting pipe 44.

Here, the box body 39 is provided in the vertically laid state extending in a perpendicular direciotn in the duct accommodating space 35 of the seat base 32. As a result, the box body 39 can be arranged in a small installation space, and moreover, the filter fitting hole 40 can be disposed at a position higher than the footrest area 33.

Figure 21:
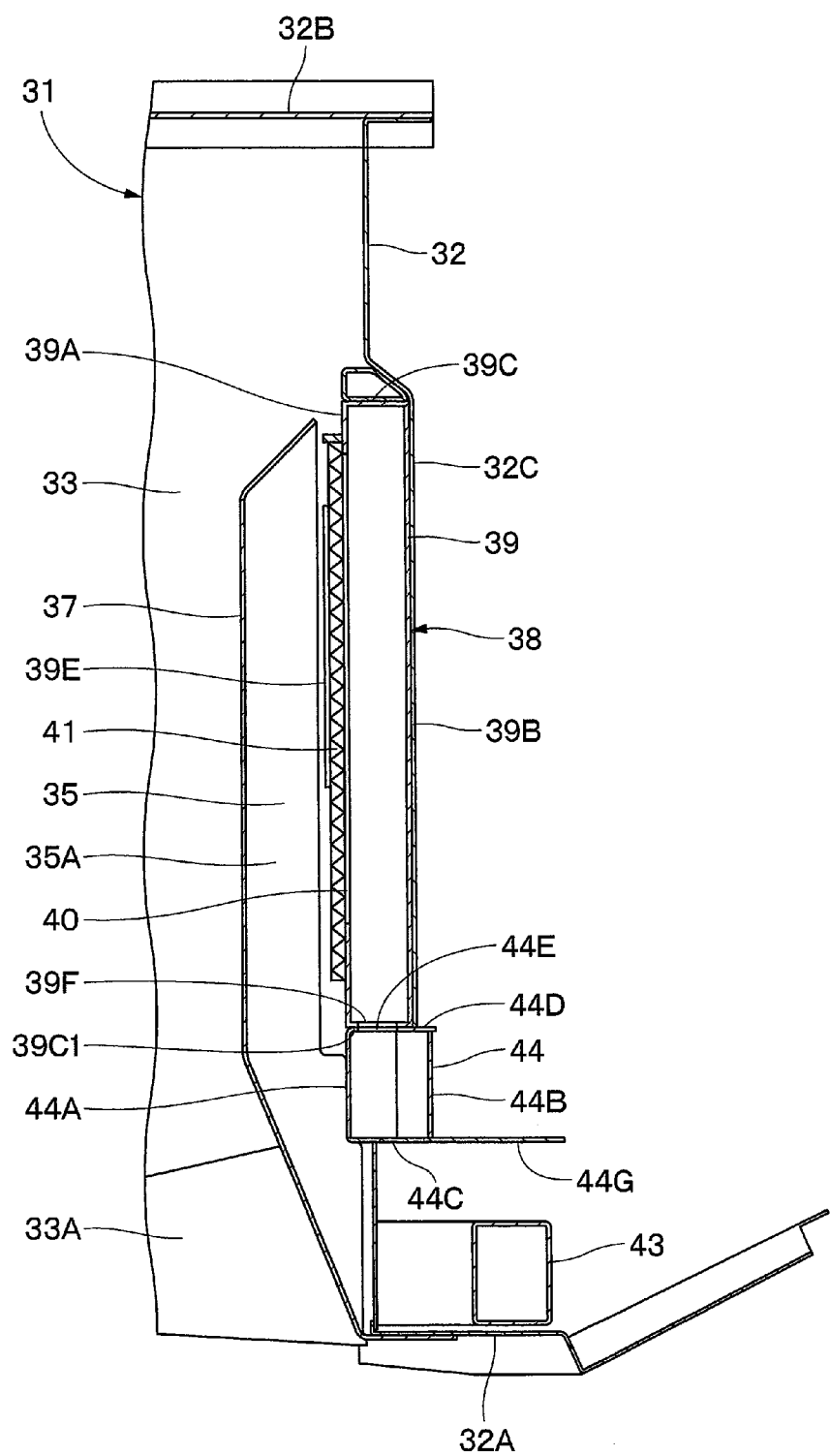
FIG. 21 is an enlarged sectional view of the floor member, the indoor air inlet duct, the indoor air filter, the front cover, and the reinforcing connecting pipe when seen from an arrow XXI-XXI direction in FIG. 20 in an enlarged manner.

That is, as shown in FIGS. 20, 21, and 22, the box body 39 is composed of a front surface plate 39A formed having a rectangular shape lengthy in the left-right direction, a rear surface plate 39B having a rectangular shape faced with the front surface plate 39A at an interval, and a peripheral surface plate 39C having a rectangular frame shape closing a space between the front surface plate 39A and the rear surface plate 39B as a cuboid container which is thin in the front-rear direction.

Filter guides 39D and 39E are provided on the front surface plate 39A for holding the indoor air filter 41 which will be described later, capable of being inserted/removed in the left-right direction with respect to the filter fitting hole 40. On the other hand, in the peripheral surface plate 39C, an indoor air outlet port 39F is provided on an abutting surface portion 39C1 on the left side in contact with the reinforcing connecting pipe 44. This indoor air outlet port 39F is connected to a communication opening 44E of the reinforcing connecting pipe 44 and allows the indoor air communicate through the reinforcing connecting pipe 44 from the indoor air inlet duct 38.

The filter fitting hole 40 is provided by being opened in the front surface plate 39A of the box body 39. This filter fitting hole 40 serves as an inlet port of the indoor air of the indoor air inlet duct 38 and is formed as a laterally long opening opened toward the front. The filter fitting hole 40 is arranged at a position higher than the footrest area 33.

The indoor air filter 41 is provided on the front surface side of the box body 39 so as to cover the filter fitting hole 40. As shown in FIG. 20, the indoor air filter 41 has its lower end arranged at a position higher than the upper surface of the footrest area 33 only by a height dimension H4 so as not to suck fine sands, dusts and the like floating over the footrest area 33.

Figure 17:
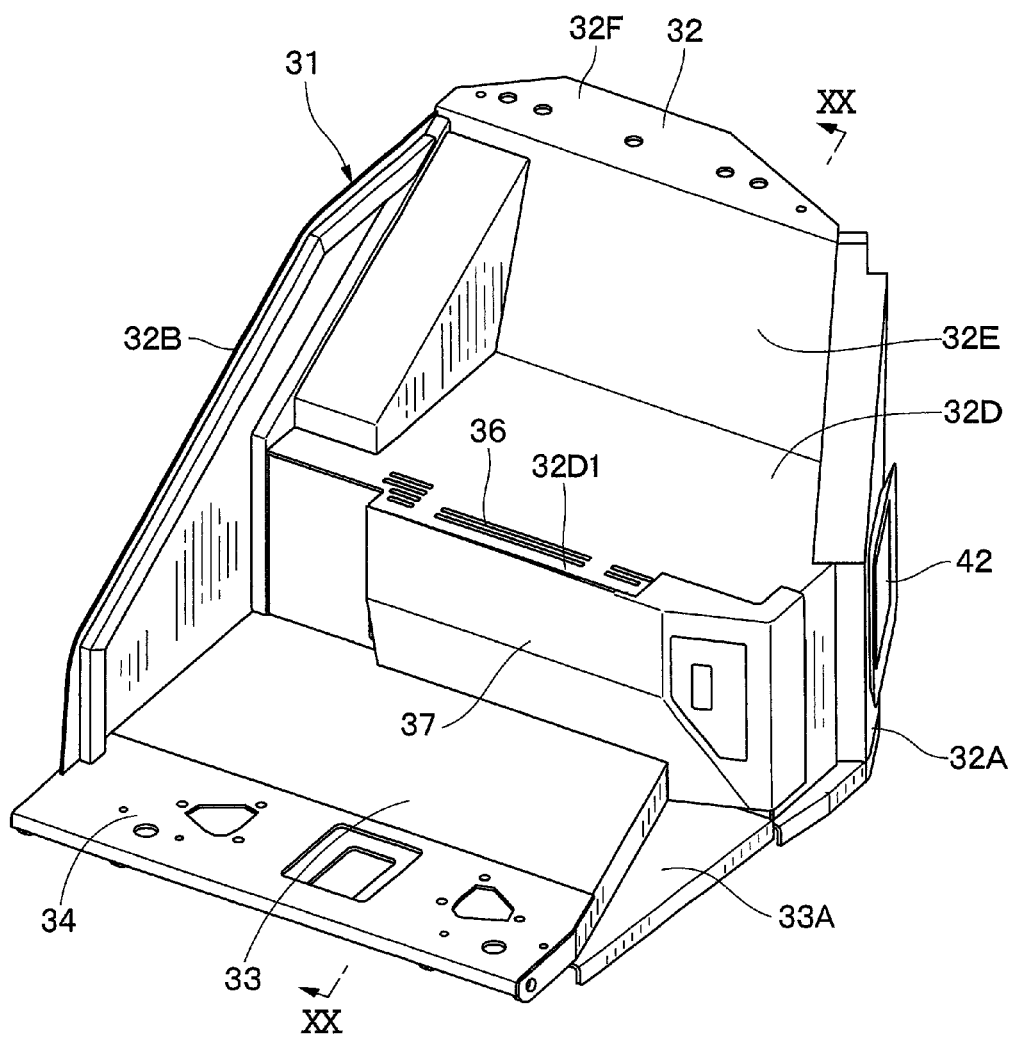
FIG. 17 is a perspective view of a state in which the front cover is mounted on a seat base of the floor member when seen from the front side.

An outdoor air inlet port 42 is provided on the left surface plate 32A of the seat base 32 (See, FIG. 17). An outdoor air inlet duct 43 is provided on the floor member 31 (See, FIG. 21), and this outdoor air inlet duct 43 connects the outdoor air inlet port 42 of the seat base 32 to the outdoor air inlet duct connecting portion 22B2 of the inlet side connecting portion 22B of the indoor unit 22.

Designated at 44 is the reinforcing connecting pipe provided between the indoor unit 22 and the indoor air inlet duct 38. This reinforcing connecting pipe 44 connects the box body 39 to the indoor unit 22 and is provided on the left side of the box body 39. The reinforcing connecting pipe 44 is provided separately from the box body 39 and is formed as a single support column having high strength and extending in the vertical direction. That is, the reinforcing connecting pipe 44 also serves as a reinforcing member for reinforcing strength of the floor member 31 by being mounted on the seat base 32.

The reinforcing connecting pipe 44 is formed having a substantially square tube shape extending in the vertical direction by a front surface portion 44A, a rear surface portion 44B, a left surface portion 44C, and a right surface portion 44D, and as a result, the reinforcing connecting pipe 44 has a closed sectional surface structure having a hollow inside. In this case, the reinforcing connecting pipe 44 having the hollow closed sectional surface structure is formed as a box-shaped strength member having high strength against deformation such as bending, twist and the like by combining a plurality of metal plate materials using bending, welding and the like.

The right surface portion 44D of the reinforcing connecting pipe 44 is brought into contact with the abutting surface portion 39C1 of the box body 39, and the communication opening 44E communicating with the indoor air outlet port 39F is formed on the right surface portion 44D. On the other hand, a lower part of the reinforcing connecting pipe 44 is a connection port 44F to be connected to the indoor air inlet duct connecting portion 22B1 of the indoor unit 22. Moreover, on the reinforcing connecting pipe 44, a support plate 44G supporting the operator's seat mounting plate 32D from the lower side is provided by extending an upper part of the left surface portion 44C to the rear side.

The indoor air inlet duct 38 configured as above can be integrally fastened by using fastening means such as welding, bonding, screwing and the like by bringing the abutting surface portion 39C1 of a peripheral surface portion 39C of the box body 39 into contact with the right surface portion 44D of the reinforcing connecting pipe 44. The indoor air inlet duct 38 can be mounted on the floor member 31 at a position in the duct accommodating space 35 of the seat base 32.

Thus, in the second embodiment configured as above, too, the working effects substantially similar to those in the above described first embodiment can be obtained. Particularly, according to the second embodiment, the reinforcing connecting pipe 44 for reinforcing the floor member 31 is provided between the box body 39 of the indoor air inlet duct 38 and the indoor air inlet duct connecting portion 22B1 of the indoor unit 22, and the indoor air inlet duct 38 has a configuration to be connected to the indoor air inlet duct connecting portion 22B1 of the indoor unit 22 through the reinforcing connecting pipe 44. Therefore, the indoor air having flowed into the ventilation path in the box body 39 of the indoor air inlet duct 38 can be supplied to the indoor unit 22 through the reinforcing connecting pipe 44. Moreover, since the reinforcing connecting pipe 44 also serves as the reinforcing member for reinforcing the floor member 31, strength of the floor member 31 can be improved without increasing the number of components.

It should be noted that, in the first embodiment, the example in which the indoor air suction port 15 is provided on the front end portion 11D1 of the operator's seat mounting plate 11D of the seat base 11 so as to be opened in the filter front space portion 14A is described. However, the present invention is not limited to that and may be configured such that the indoor air suction port is provided at a position on the upper side of the front cover 16 so as to be opened in the filter front space portion 14A, for example. Moreover, it may be so configured that the indoor air suction port is provided on both the operator's seat mounting plate 11D and the front cover 16. These configurations can be similarly applied to the second embodiment.

In the first embodiment, the example in which the indoor unit 22 of the air-conditioning unit is configured to be mounted on the back surface side of the footrest area 12 of the floor member 10 is described. However, the present invention is not limited to that and may be configured such that the floor member has a double-floor structure composed of a lower floor plate and an upper floor plate, for example, the lower floor plate is largely recessed so as to accommodate the indoor unit in this recessed portion, and the upper side of the indoor unit is covered by the upper floor plate. This configuration can be similarly applied to the second embodiment.

On the other hand, in the first embodiment, the example in which the floor member 10 is configured capable of tilting up/down using the front position as a fulcrum with respect to the revolving frame 6 is described. However, the present invention is not limited to that and may be also applied to a hydraulic excavator of a type in which the floor member is provided by being fixed to the revolving frame, for example. This configuration can be similarly applied to the second embodiment.

Moreover, in each of the embodiments, the cab-equipped hydraulic excavator 1 provided with the crawler type lower traveling structure 2 is described as an example of a construction machine. However, the present invention is not limited to that and may be applied to a hydraulic excavator provided with a wheel type lower traveling structure, for example. Moreover, the present invention may be applied to other construction machines including a hydraulic crane.

DESCRIPTION OF REFERENCE NUMERALS

1: Hydraulic excavator (Construction machine)
2: Lower traveling structure
3: Upper revolving structure
4: Working mechanism
5: Counterweight
6: Revolving frame
7: Engine (Prime mover)
10, 31: Floor member
11, 32: Seat base
11A, 32A: Left surface plate
11B, 32B: Right surface plate
11C, 32C: Rear surface plate
11D, 32D: Operator's seat mounting plate
11D1, 32D1: Front end portion
11E, 32E: Rear plate
12, 33: Footrest area
14, 35: Duct accommodating space
14A, 35A: Filter front space portion
15, 36: Indoor air suction port
16, 37: Front cover
17: Operator's seat
20: Cab box
21: Occupying space
22: Indoor unit
22B: Inlet side connecting portion
22B1: Indoor air inlet duct connecting portion
23, 38: Indoor air inlet duct
24, 39: Box body
24A, 39A: Front surface plate
24B, 39B: Rear surface plate
24C, 39C: Peripheral surface plate
24F, 39F: Indoor air outlet port
25, 40: Filter fitting hole
26, 41: Indoor air filter
44: Reinforcing connecting pipe
O: Revolving center
R: Revolving radius

The invention claimed is:

1. A construction machine comprising:
an automotive lower traveling structure (2);
an upper revolving structure (3) rotatably mounted on said lower traveling structure (2);
a working mechanism (4) provided capable of moving upward/downward on said upper revolving structure (3); and
a counterweight (5) provided on the rear side of said upper revolving structure (3) in order to keep balance with said working mechanism (4), wherein
said upper revolving structure (3) is provided with a revolving frame (6) forming a support structural body, a floor member (10, 31) provided on said revolving frame (6) and having the rear side as a seat base (11, 32) on which an operator's seat (17) is mounted and the front side as a flat-plate shaped footrest area (12, 33) on which an operator places a foot, a cab box (20) provided covering a periphery and an upper part of said floor member (10, 31) and forming an occupying space (21) inside, and an indoor unit (22) of an air conditioning unit mounted on said floor member (10, 31) and supplying sucked air to said occupying space (21) as conditioning air; characterized in that:
said seat base (11, 32) of said floor member (10, 31) has a rear surface plate (11C, 32C) rising from a rear end of said footrest area (12, 33) and extending in a left-right direction, an operator's seat mounting plate (11D, 32D) provided on an upper end of said rear surface plate (11C, 32C) and extending in the front-rear direction and on which said operator's seat (17) is mounted, and a duct accommodating space (14, 35) formed in the vertical direction among said rear surface plate (11C, 32C), said operator's seat mounting plate (11D, 32D), and said footrest area (12, 33);

an indoor air inlet duct (23, 38) having the front surface side opened as a filter fitting hole (25, 40) and introducing air in said occupying space (21) toward said indoor unit (22) is provided in said duct accommodating space (14, 35); and an indoor air filter (26, 41) for catching dusts in the air is provided on said filter fitting hole (25, 40) of said indoor air inlet duct (23, 38).

2. The construction machine according to claim 1, wherein said indoor air inlet duct (23, 38) is configured such that said indoor air filter (26, 41) is mounted vertically so that a sucking surface is oriented perpendicularly.

3. The construction machine according to claim 1, wherein a left surface plate (11A, 32A) and a right surface plate (11B, 32B) supporting both ends in the left-right direction of said operator's seat mounting plate (11D, 32D) is provided on said seat base (11, 32) of said floor member (10, 31), respectively; and said duct accommodating space (14, 35) is configured such that the both ends in the left-right direction are closed by each of said side surface plates (11A, 11B, 32A, 32B).

4. The construction machine according to claim 1, wherein a front cover (16, 37) closing said duct accommodating space (14, 35) between said footrest area (12, 33) and said operator's seat mounting plate (11D, 32D) and also covering the front side of said indoor air filter (26, 41) is provided on the front side of said seat base (11, 32); and an indoor air suction port (15, 36) opened in a filter front space portion (14A, 35A) between a rear surface of said front cover (16, 37) and a front surface of said indoor air filter (26, 41) is provided on a front end portion (11D1, 32D1) of said operator's seat mounting plate (11D, 32D), and said indoor air filter (26, 41) is configured such that indoor air is made to flow in from said indoor air suction port (15, 36) through said filter front space portion (14A, 35A).

5. The construction machine according to claim 1, wherein said indoor air inlet duct (23, 38) is composed of a hollow box body (24, 39) having the inside as a ventilation path and said filter fitting hole (25, 40) provided by being opened on a front surface (24A, 39A) side of said box body (24, 39) and on which said indoor air filter (26, 41) is mounted; and an indoor air outlet port (24F, 39F) of said box body (24, 39) is configured to connect to an indoor air inlet duct connecting portion (22B1) of said indoor unit (22).

6. The construction machine according to claim 1, wherein said indoor unit (22) of said air conditioning unit is configured to be mounted on the back surface side of said footrest area (12, 33) of said floor member (10, 31).

7. The construction machine according to claim 5, wherein a reinforcing connecting pipe (44) for reinforcing said floor member (31) is provided between a box body (39) of said indoor air inlet duct (38) and an indoor air inlet duct connecting portion (22B1) of said indoor unit (22), and said indoor air inlet duct (38) is configured to connect to said indoor air inlet duct connecting portion (22B1) of said indoor unit (22) through said reinforcing connecting pipe (44).

8. The construction machine according to claim 1, wherein said upper revolving structure (3) is formed as a rear small-revolving machine having a revolving radius (R) between a revolving center (0) with respect to said lower traveling structure (2) and said counterweight (5), a prime mover (7) is provided at a position on the front side of said counterweight (5) on said upper revolving structure (3), and said floor member (10, 31) is provided on said revolving frame (6) at a position on the front side of said prime mover (7).

* * * * *